(12) United States Patent
Galvin

(10) Patent No.: US 10,881,935 B2
(45) Date of Patent: Jan. 5, 2021

(54) EXERCISE ASSEMBLY FOR A PADDLER

(71) Applicant: Bradley John Byron Galvin, Burnaby (CA)

(72) Inventor: Bradley John Byron Galvin, Burnaby (CA)

(*) Notice: Subject to any disclaimer, the term of this patent is extended or adjusted under 35 U.S.C. 154(b) by 44 days.

(21) Appl. No.: 16/393,874

(22) Filed: Apr. 24, 2019

(65) Prior Publication Data

US 2020/0016470 A1    Jan. 16, 2020

Related U.S. Application Data

(60) Provisional application No. 62/661,859, filed on Apr. 24, 2018.

(51) Int. Cl.
   *A63B 69/00*    (2006.01)
   *A63B 69/06*    (2006.01)

(52) U.S. Cl.
   CPC .......... *A63B 69/0093* (2013.01); *A63B 69/06* (2013.01); *A63B 2069/068* (2013.01); *A63B 2208/0204* (2013.01)

(58) Field of Classification Search
   CPC ...... A63B 35/06; A63B 2069/062–068; A63B 69/06; A63B 69/18–187; A63B 22/02
   See application file for complete search history.

(56) References Cited

U.S. PATENT DOCUMENTS

| | | | | |
|---|---|---|---|---|
| 2,772,881 A | * | 12/1956 | Fundom | A63B 23/03583 482/70 |
| 4,469,325 A | * | 9/1984 | Ware | A63B 21/015 482/72 |
| 4,679,786 A | * | 7/1987 | Rodgers | A63B 21/154 482/70 |
| 4,948,121 A | * | 8/1990 | Haaheim | A63B 22/0012 434/253 |
| 4,960,276 A | * | 10/1990 | Feuer | A63B 21/157 482/4 |
| 5,000,442 A | * | 3/1991 | Dalebout | A63B 21/018 482/120 |
| 5,108,093 A | * | 4/1992 | Watterson | A63B 22/0012 482/112 |
| 5,192,257 A | * | 3/1993 | Panasewicz | A63B 21/154 482/134 |
| 5,277,678 A | * | 1/1994 | Friedebach | A63B 21/015 482/70 |
| 5,368,533 A | * | 11/1994 | Feuer | A63B 21/154 482/134 |

(Continued)

OTHER PUBLICATIONS

International Searching Authority, The International Search Report and the Written Opinion of the International Searching Authority, or the Declaration, International Application No. PCT/CA2019050524, Filed Apr. 24, 2019, 9 pages, Receiving Office—Canadian Intellectual Property Office.

*Primary Examiner* — Nyca T Nguyen
(74) *Attorney, Agent, or Firm* — Richard D. Okimaw

(57) ABSTRACT

An exercise apparatus comprises a body having a top surface adapted to support a user standing thereon, an endless band extending around said body along a path substantially perpendicular to said top surface, said endless band being slidably supported by said top body for rotational movement thereabout and a plurality of protrusions extending from said endless band adapted to be engaged upon by an object manipulated by the user.

20 Claims, 24 Drawing Sheets

(56) References Cited

U.S. PATENT DOCUMENTS

| | | | |
|---|---|---|---|
| 5,429,567 A * | 7/1995 | Gerschefske | A63B 21/023 482/51 |
| 5,433,683 A * | 7/1995 | Stevens | A63B 22/203 482/70 |
| 5,443,433 A * | 8/1995 | Krag | A63B 21/153 482/51 |
| 5,792,029 A * | 8/1998 | Gordon | A63B 22/001 482/52 |
| 6,893,382 B1 * | 5/2005 | Moon | A63B 21/154 482/51 |
| 7,018,323 B1 * | 3/2006 | Reynolds | A63B 7/04 482/112 |
| 7,303,506 B1 * | 12/2007 | Reynolds | A63B 7/04 482/112 |
| 7,955,225 B1 * | 6/2011 | James | A63B 22/0664 482/51 |
| 8,708,867 B2 | 4/2014 | Lumsden et al. | |
| 9,452,310 B2 | 9/2016 | Broffman | |
| 9,533,187 B2 | 1/2017 | Dalebout | |
| 2001/0012811 A1 * | 8/2001 | Gordon | A63B 21/012 482/70 |
| 2002/0155927 A1 * | 10/2002 | Corbalis | A63B 22/0664 482/52 |
| 2004/0014568 A1 * | 1/2004 | Williams | A63B 21/068 482/37 |
| 2004/0058784 A1 * | 3/2004 | Roberts, Jr. | A63B 23/0417 482/52 |
| 2005/0043153 A1 * | 2/2005 | Krietzman | A63B 21/0603 482/115 |
| 2010/0311552 A1 * | 12/2010 | Sumners | A63B 21/0087 482/111 |
| 2011/0275489 A1 | 11/2011 | Apau | |
| 2012/0184409 A1 * | 7/2012 | Beal | A63B 23/1209 482/5 |
| 2013/0017932 A1 * | 1/2013 | Tayebi | A63B 21/0088 482/94 |
| 2013/0017934 A1 * | 1/2013 | Tayebi | A63B 21/4047 482/129 |
| 2014/0087922 A1 * | 3/2014 | Bayerlein | A63B 21/00181 482/54 |
| 2014/0162848 A1 | 6/2014 | Fuller | |
| 2014/0221169 A1 * | 8/2014 | Bourne | A63B 69/0093 482/72 |
| 2015/0165266 A1 | 6/2015 | Powers | |
| 2016/0038782 A1 | 2/2016 | Broffman | |
| 2016/0059060 A1 * | 3/2016 | Lagree | A63B 21/0428 482/129 |
| 2017/0165552 A1 * | 6/2017 | Martin | A63B 26/003 |
| 2017/0197132 A1 * | 7/2017 | Bowers | A63B 69/0048 |

\* cited by examiner

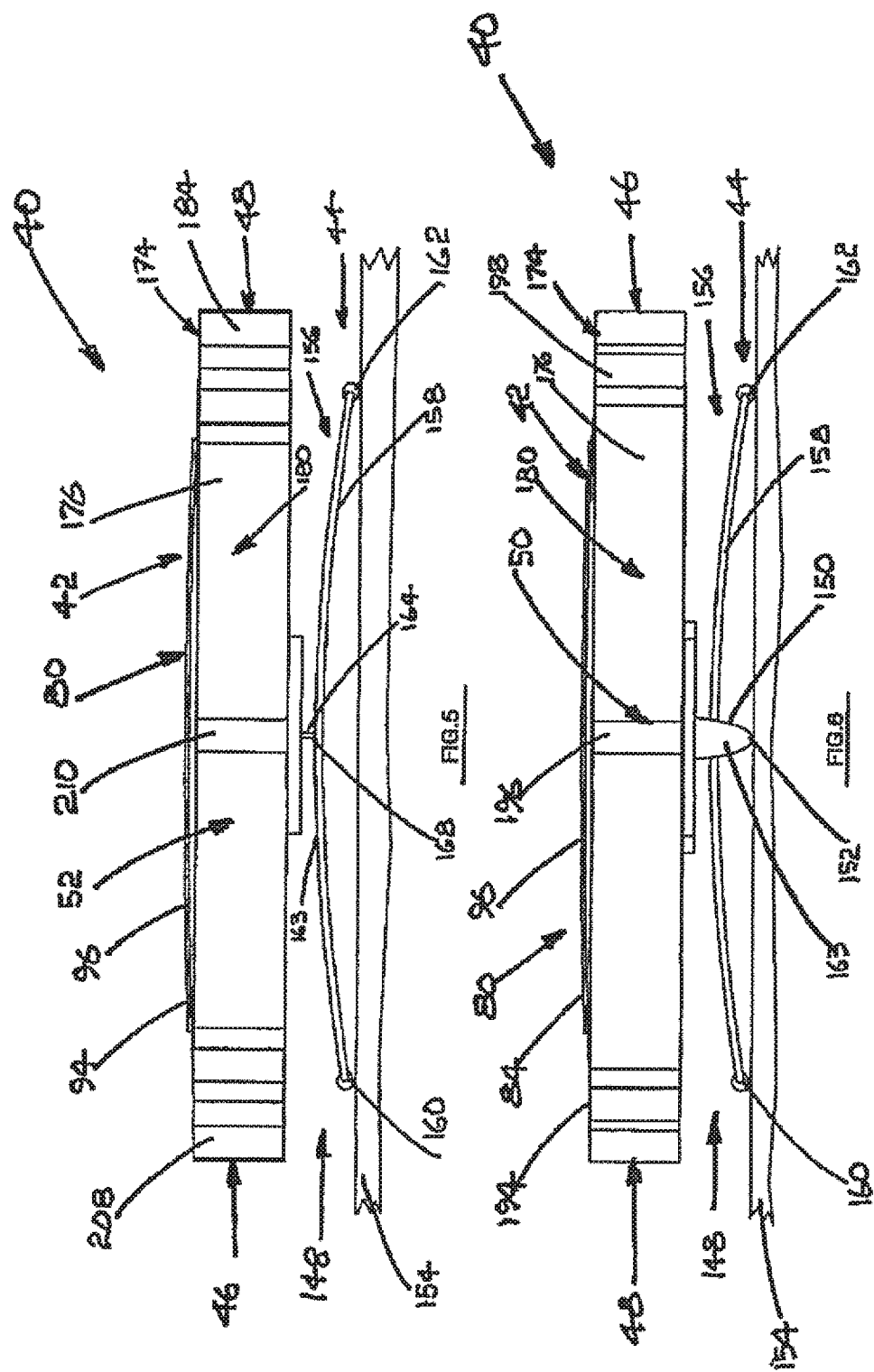

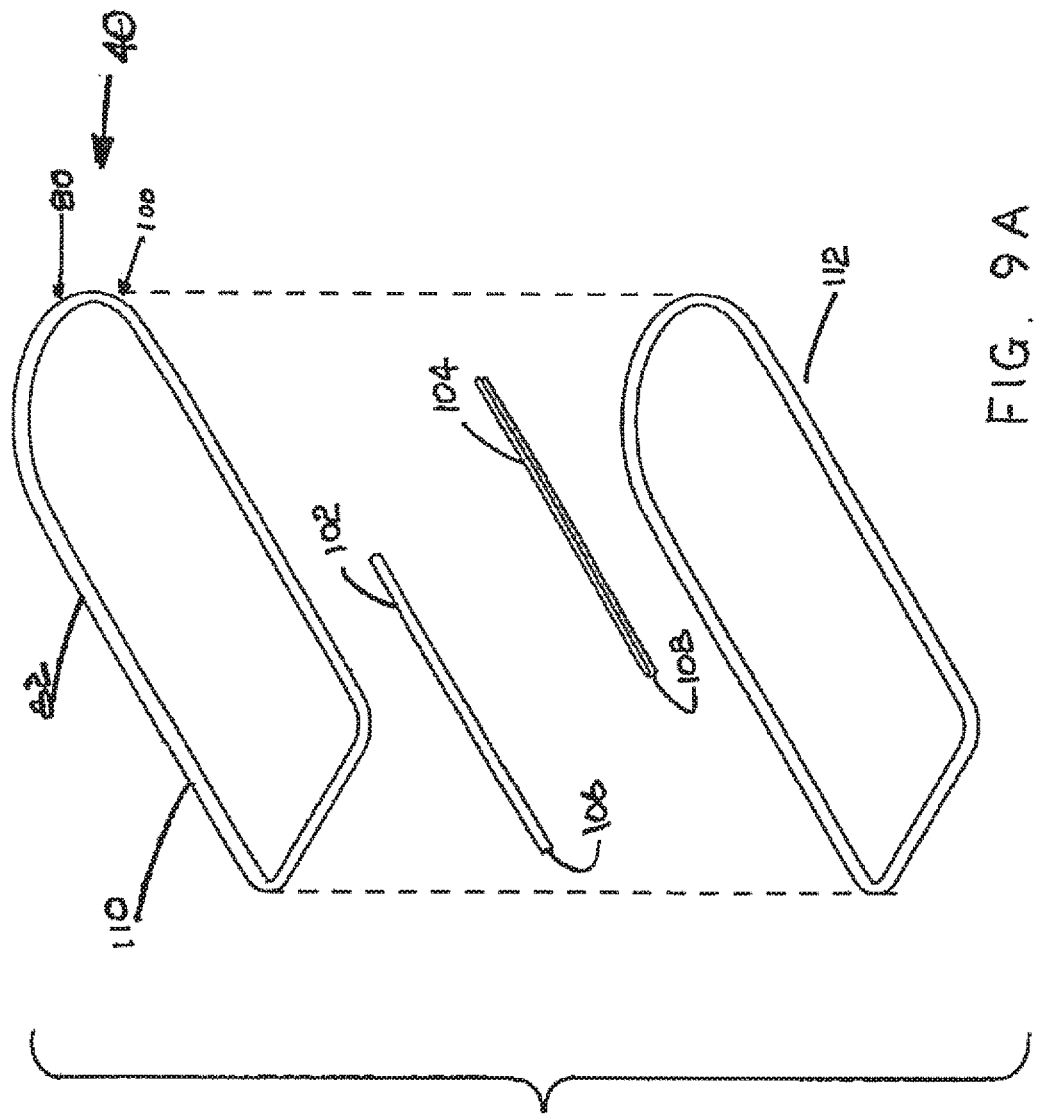

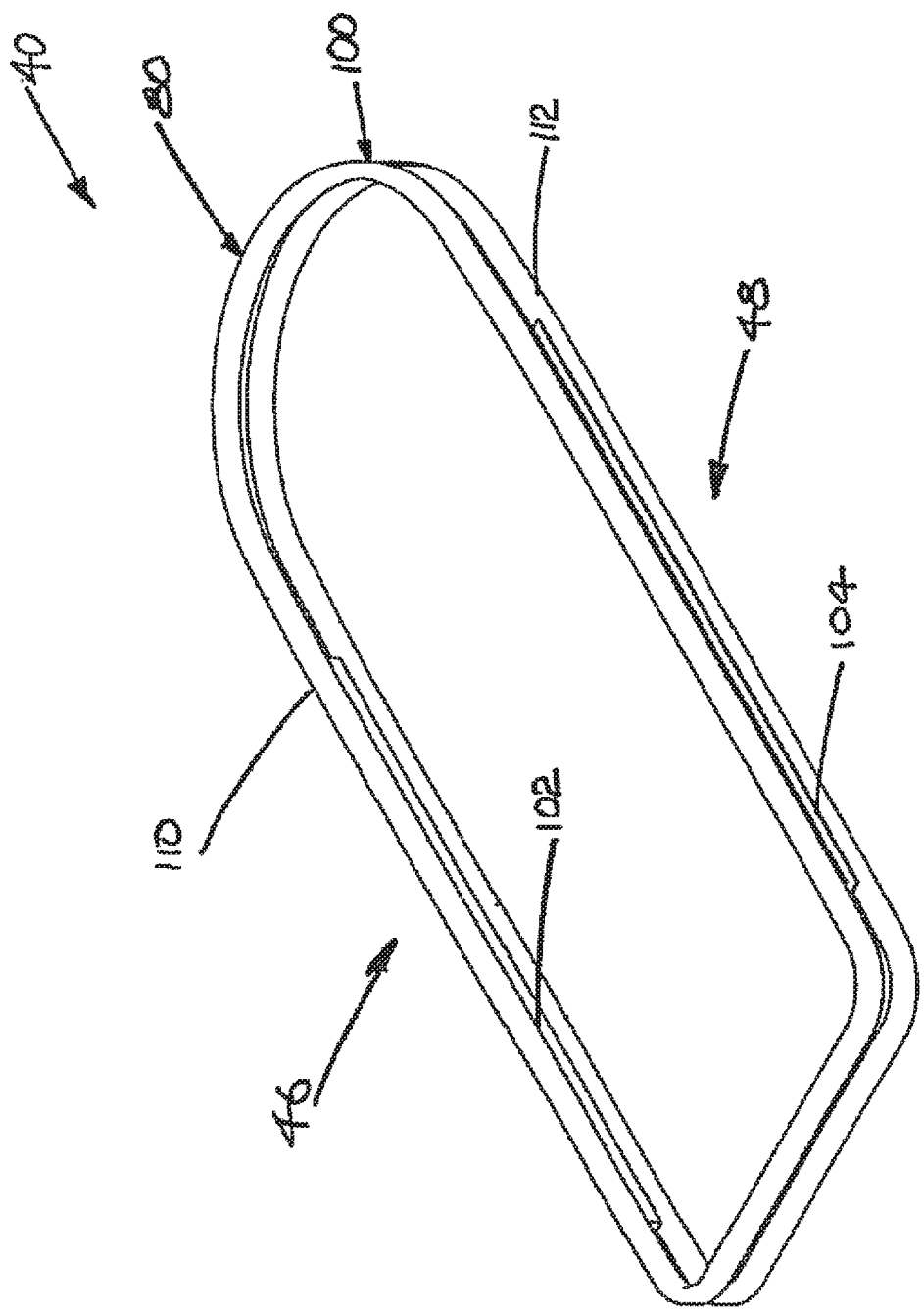

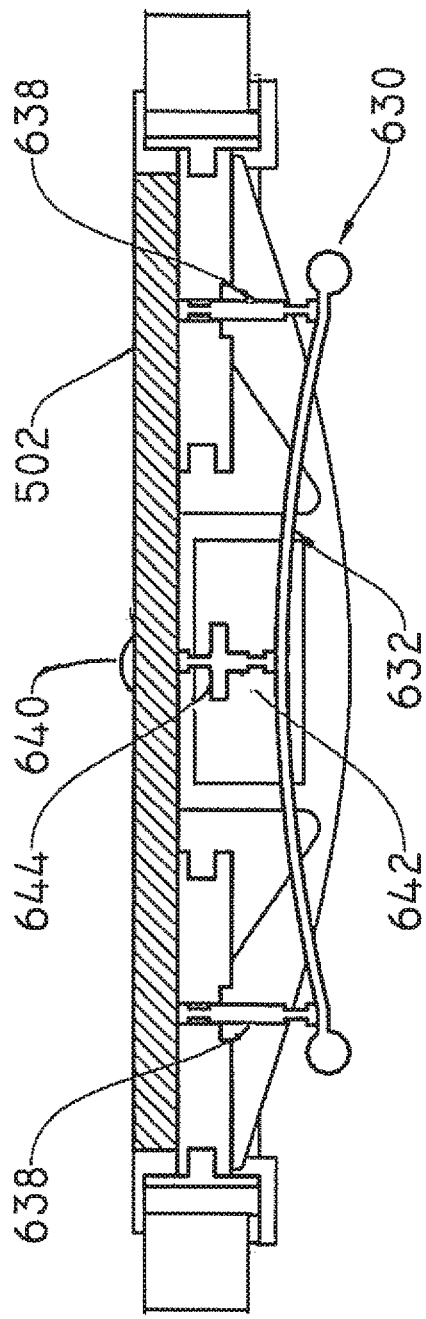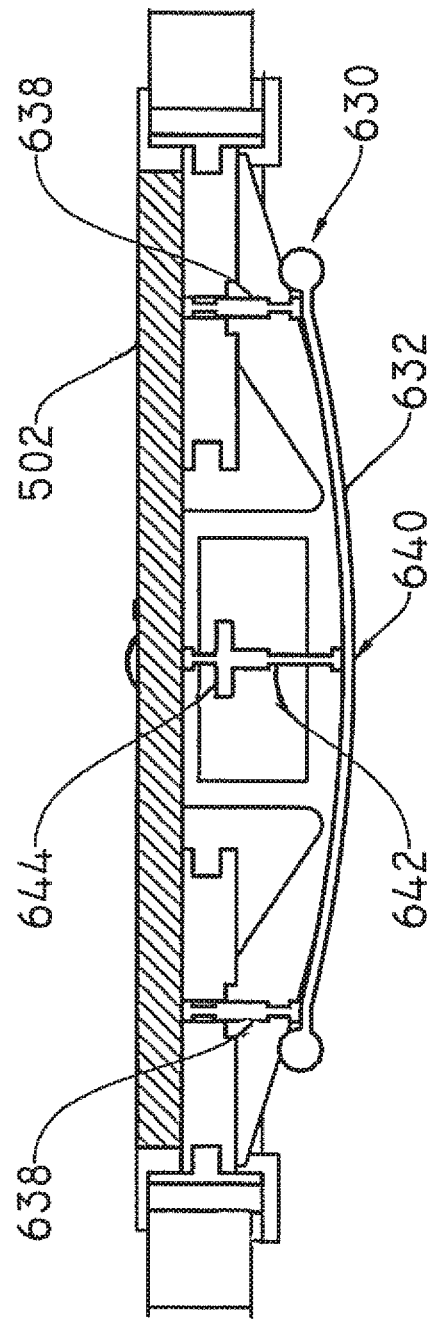

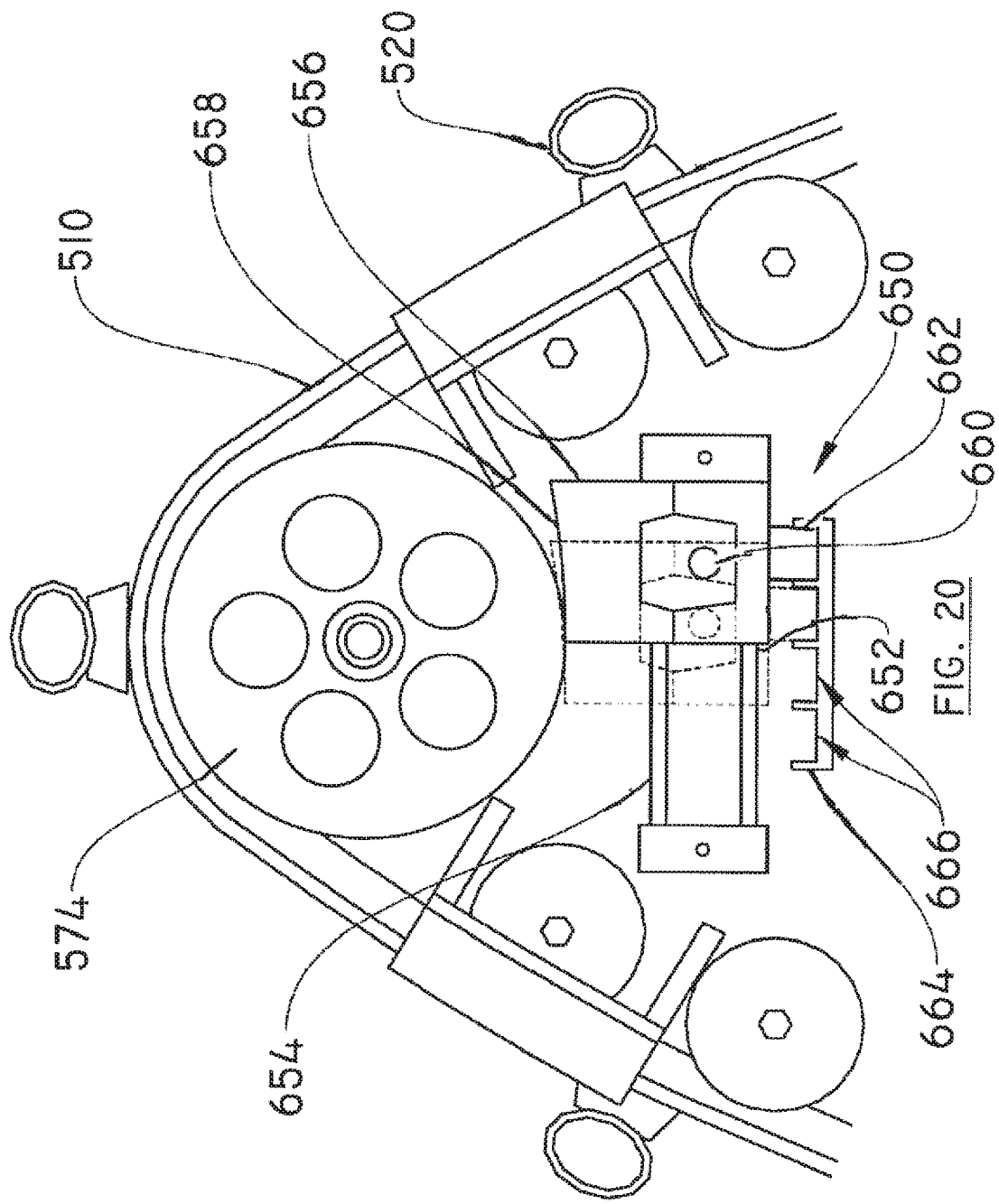

EXERCISE ASSEMBLY FOR A PADDLER

CROSS REFERENCE TO RELATED APPLICATION

This application claims priority to U.S. Provisional Patent Application No. 62/661,859 filed Apr. 24, 2018 entitled Exercise Assembly For A Paddler.

BACKGROUND OF THE INVENTION

1. Field of Invention

The present invention relates generally to an exercise assembly. In particular, the invention relates to an exercise assembly for a paddler. The assembly promotes ergonomically correct positioning of the paddler thereon whilst the paddler is reaching for a full stroke using large core muscle groups.

2. Description of Related Art

Paddle boarding is an activity that is enjoyed by many people. One difficulty with the activity of paddle boarding is that it is often limited to periods of nice weather such as summer or warm and sunny days. This is particularly problematic in colder and norther climates.

Attempts have been previously provided to train a user in the use an operation of a paddle board on land. However such attempts have been overly large and complicated and have not accurately replicated both the movement of the paddle through the water when paddle boarding. Nor have such attempts replicated the balance requirements of operating a paddle board. Examples of such attempts may be found in U.S. Pat. No. 8,708,867 to Lumsden et al. and US Patent Application Publication Nos. 2014/0221169 to Bourne et al., 2017/0165552 to Martin and 2011/0275489 to Apau.

SUMMARY OF THE INVENTION

According to a first embodiment of the present invention there is disclosed an exercise apparatus comprising a body having a top surface adapted to support a user standing thereon, an endless band extending around said body along a path substantially perpendicular to said top surface, said endless band being slidably supported by said top body for rotational movement thereabout and a plurality of protrusions extending from said endless band adapted to be engaged upon by an object manipulated by the user.

The body may include a plurality of rollers supporting said endless band. The body may include at least one guide vertically supporting said endless band. The at least one guide may include at least one bottom guide below said endless band. The at least one bottom guide may be located in a front portion of said body. The at least one guide may include at least one top guide above said endless band. The at least one top guide may be located in a rear portion of said body.

Each of the plurality of protrusions may include an enlarged distal portion and a connecting portion between said distal portions and said endless loop. The enlarged portion may have a width greater than said connecting portion along a direction parallel to said endless loop. The connecting portion may taper in width from an end adjacent to said endless loop to an end adjacent to said enlarged portion.

The body may include at least one ground support extending from a bottom thereof. The at least one ground support may include a front ground support located adjacent to a front end of said body, a rear ground support located adjacent to a rear end of said body and a middle ground support located at a midpoint of said body. The at least one of said ground supports may comprise an arcuate surface so as to permit said body to rotate thereon along a longitudinal axis relative to a supporting surface.

The at least one of said ground supports may comprise a flexible member fixedly supported at ends thereof and having an adjustable support at a middle portion thereof, wherein adjustment of said adjustable support varies the radius of said flexible member to adjust the stability of said body. The adjustable support may comprise a threaded rod.

The apparatus may further comprise a brake selectably engageable upon at least one of said rollers so as to adjust a resistance to rotation of said endless belt. The brake may comprise a shoe having a braking surface slidably movable into engagement upon said at least one of said rollers. The apparatus may further comprise a tensioning roller rotatably engageable upon said endless loop in a radial direction to apply adjustable tension to said endless loop. The body is formed in two portions hinged together at a midpoint thereof.

According to a further embodiment of the present invention there is disclosed a method of simulating a paddle board comprising supporting a user upon a top surface of a body, rotatably supporting an endless band around said body along a path substantially perpendicular to said top surface for rotational movement thereabout and receiving an engagement upon at least one of a plurality of protrusions extending radially from said endless loop by an object manipulated by the user.

The present invention provides an improved exercise assembly for a paddler. There is accordingly provided an exercise assembly according to a further aspect of the present invention including a body upon which a person may stand. The assembly includes an endless band circumambient to and rotatably coupled to the body. The band is engageable with a pole to selectively rotate the band relative to the body.

According to a further aspect of the present invention, there is provided an exercise assembly including a body upon which a person may stand. The assembly includes at least one peripheral member that couples to and is moveable linearly at least in part relative to the body. The peripheral member is configured to engage with a pole to selectively move the peripheral member relative to the body.

According to a further aspect of the present invention, there is provided an exercise assembly including a body having a central aperture shaped to receive a person in a wheelchair therethrough. The assembly includes at least one peripheral member that couples to and is moveable linearly at least in part relative to the body. The peripheral member is configured to engage with a pole to selectively move the peripheral member relative to the body.

According to a further aspect of the present invention, there is provided an exercise assembly including a body upon which a person may stand. The assembly includes a lower base upon which the body is mounted. The base has a stable configuration in which stability of the body is promoted. The base is adjustable to an unstable configuration in which stability of the body is reduced.

According to a further aspect of the present invention, there is provided an exercise assembly including a body upon which a person may stand. The assembly includes an endless band circumambient to and rotatably coupled to the body. A first of the body and the band includes an elongate female member.

A second of the body and the band includes an elongate male member shaped to be received within and slidably engage with the female member. The band includes an elongate portion and a series of longitudinally spaced-apart protrusions that extend outwardly from the elongate portion of the band. A pole is selectively engageable with respective ones of the protrusions to rotate the band relative to the body.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

FIG. 5 is a rear elevation view thereof, with a front leg of the assembly not being shown;

FIG. 6 is a front elevation view thereof;

FIG. 9a is an exploded view of the rail system of the body of the assembly of FIG. 1;

FIG. 9b is a top, rear, side perspective view of the rail system of the body of the assembly of FIG. 9a;

FIG. 19a is a cross sectional view of the exercise apparatus of FIG. 17 as taken along the line 19-19 with the adjustable support at a raised or stable position.

FIG. 19b is a cross sectional view of the exercise apparatus of FIG. 17 as taken along the line 19-19 with the adjustable support at a lowered or rocking position.

FIG. 20 is a detailed bottom plan view of the brake of the exercise apparatus of FIG. 17.

DETAILED DESCRIPTION

Figure 1:
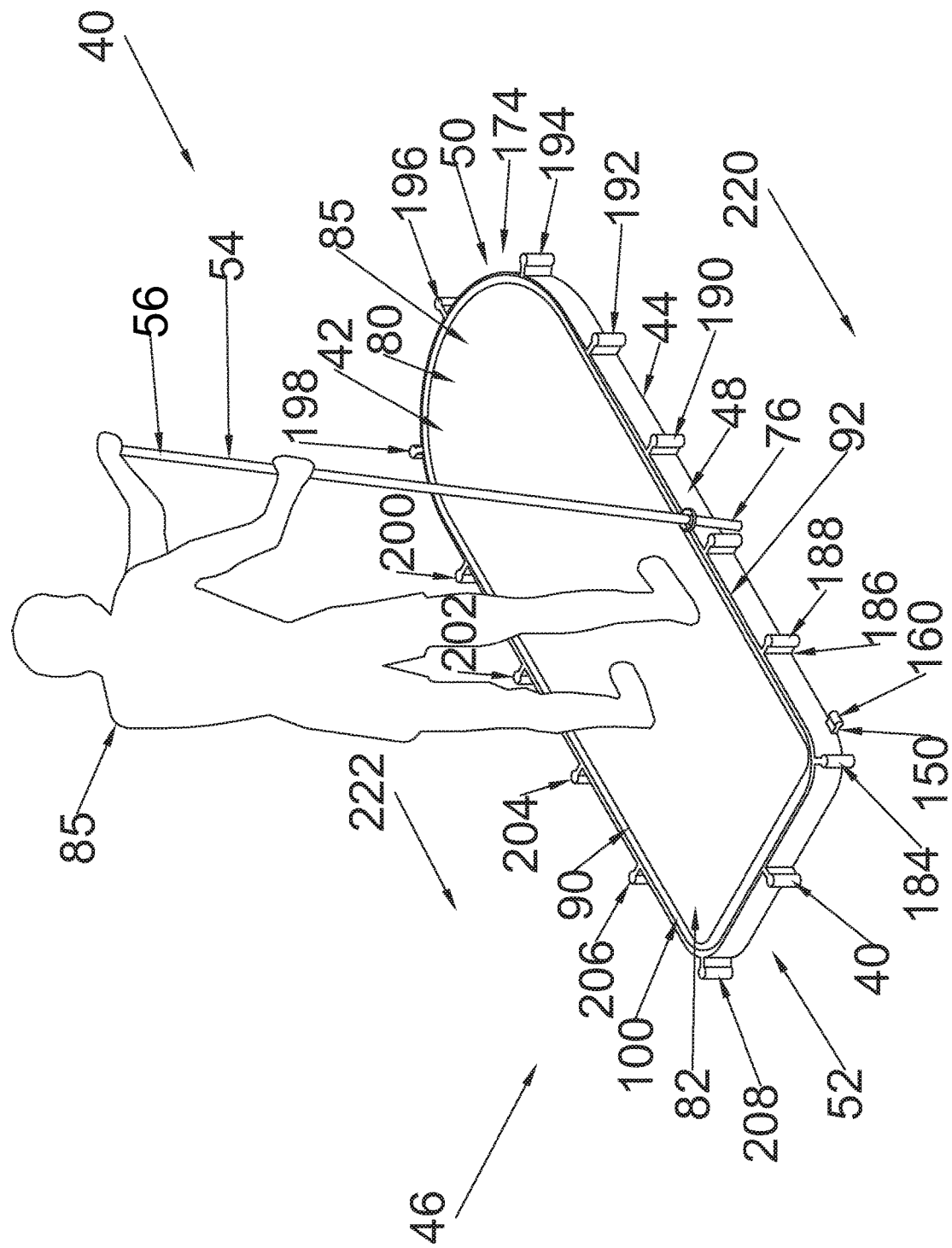
FIG. 1 is a top perspective view of an exercise assembly according to a first embodiment of the present invention with a user together with a pole located thereon.

Referring to FIG. 1, an apparatus for simulating a paddle board motion according to a first embodiment of the invention there is shown an exercise assembly, in this example an exercise assembly 40 for a person, in this example paddler 85. The assembly 40 has a top 42, a bottom 44, a pair of spaced-apart sides 46 and 48 20 extending between the top and bottom thereof, a front 50 and a rear 52. The front and rear of the assembly extend between the sides, top and bottom of the assembly.

Figure 3:
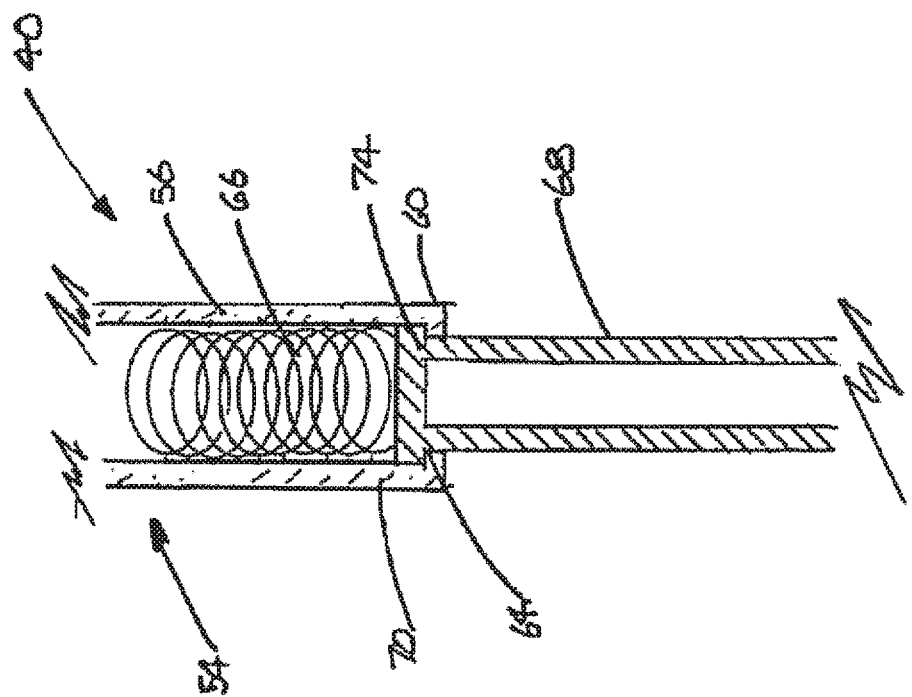
FIG. 3 is a sectional, fragmentary view taken along lines 3-3 of the pole of FIG. 2.
Figure 2:
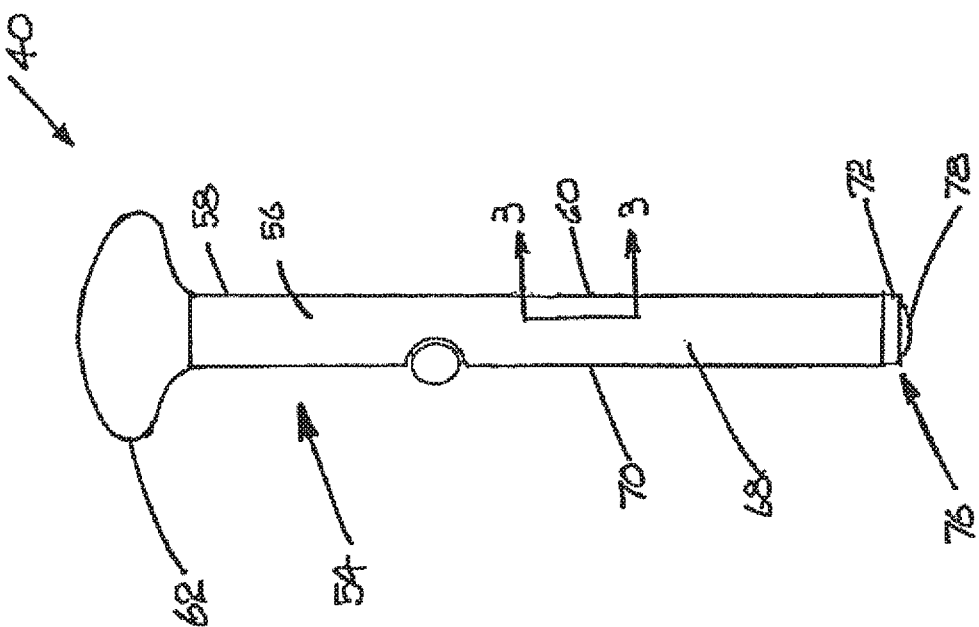
FIG. 2 is an elevation view of the pole of FIG. 1.

As best seen in FIG. 2, the assembly includes a pole, in this example a length-variable shaft assembly 54. The shaft assembly includes an outer tube 56 having a first or upper end 58 and a second or lower end 60. The shaft assembly 54 includes a knob or grip 62 coupled to the upper end of the outer tube. As seen in FIG. 3, the outer tube 56 has an inwardly-extending, annular flange 64 at the lower end 60 thereof. The shaft assembly 54 in this example includes a resilient member, in this example a coil spring 66 disposed within the outer tube.

Referring to FIG. 2, the shaft assembly 54 includes an inner tube 68 having an upper end 70 and a lower end 72. As seen in FIG. 3, the upper end of the inner tube is closed, positioned within the outer tube 56 and includes a radially outwardly extending annular rim 74 shaped to selectively abut flange 64 of the outer tube. As seen in FIG. 2, the shaft assembly 54 includes a friction-reducing member, in this example a ball transfer unit 76 comprising a load-bearing spherical ball 78 rotatably mounted to the lower end 72 of the inner tube 68.

Figure 4:
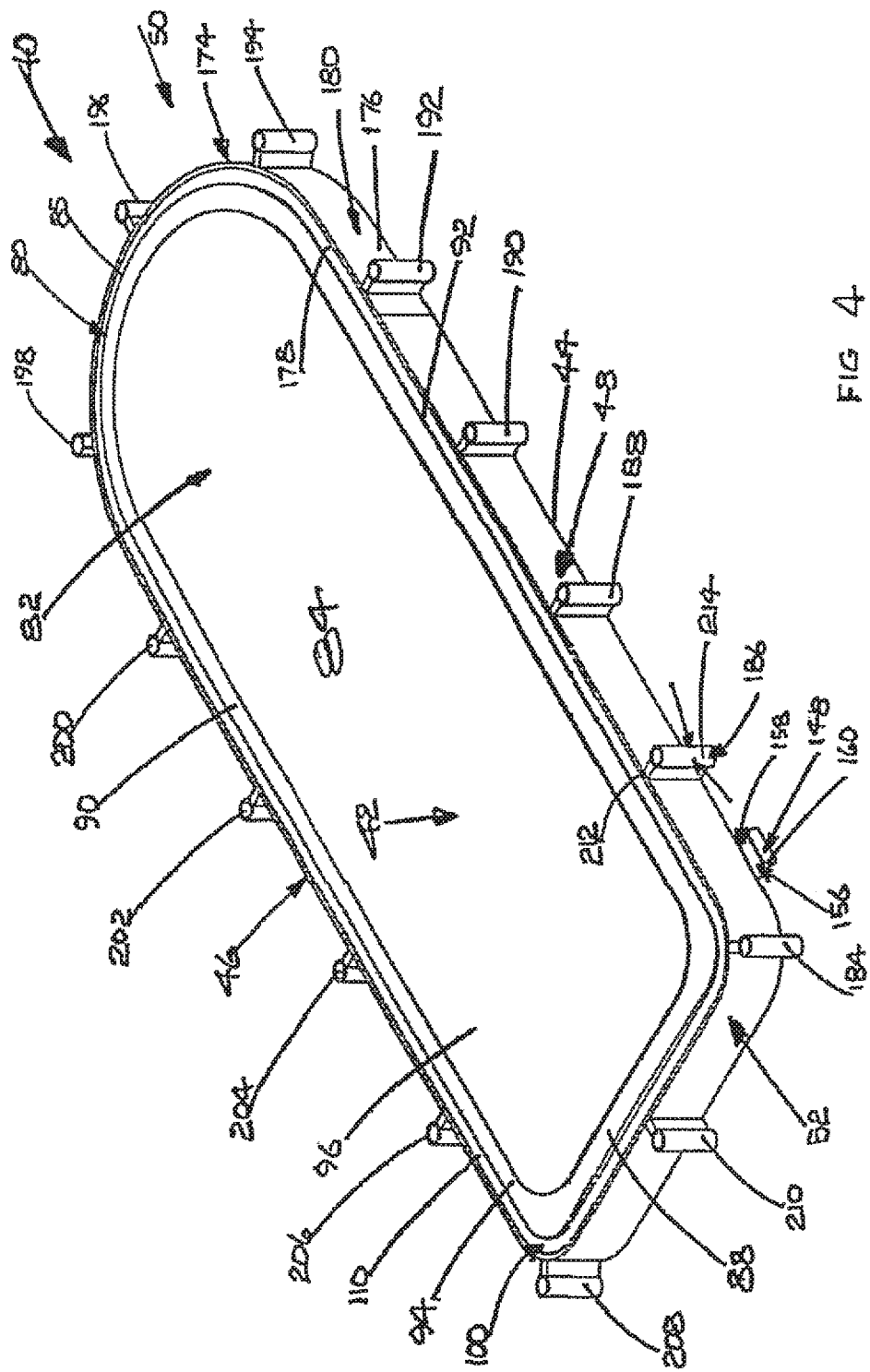
FIG. 4 is a top, rear, side perspective view of the assembly of FIG. 1.

Referring now to FIG. 1, the exercise assembly 40 includes a body 80. The body includes a platform 84 with a planar top 82 upon which a paddler 85 may stand. The platform extends along the top of the body. As seen in FIG. 4, the platform 84 has a semi-circular anterior end 86 in this example adjacent to the front of the front 50 of the assembly 40. The platform has a posterior end 88 in this example adjacent to the rear 52 of the assembly that is straight and perpendicular to sides 46 and 48 of the assembly. The platform 84 has a pair of spaced-apart, elongate parallel sides 90 and 92 which extend between the posterior and anterior ends thereof. The sides of the platform are adjacent to the respective sides 46 and 48 of the assembly 40.

Figure 10:
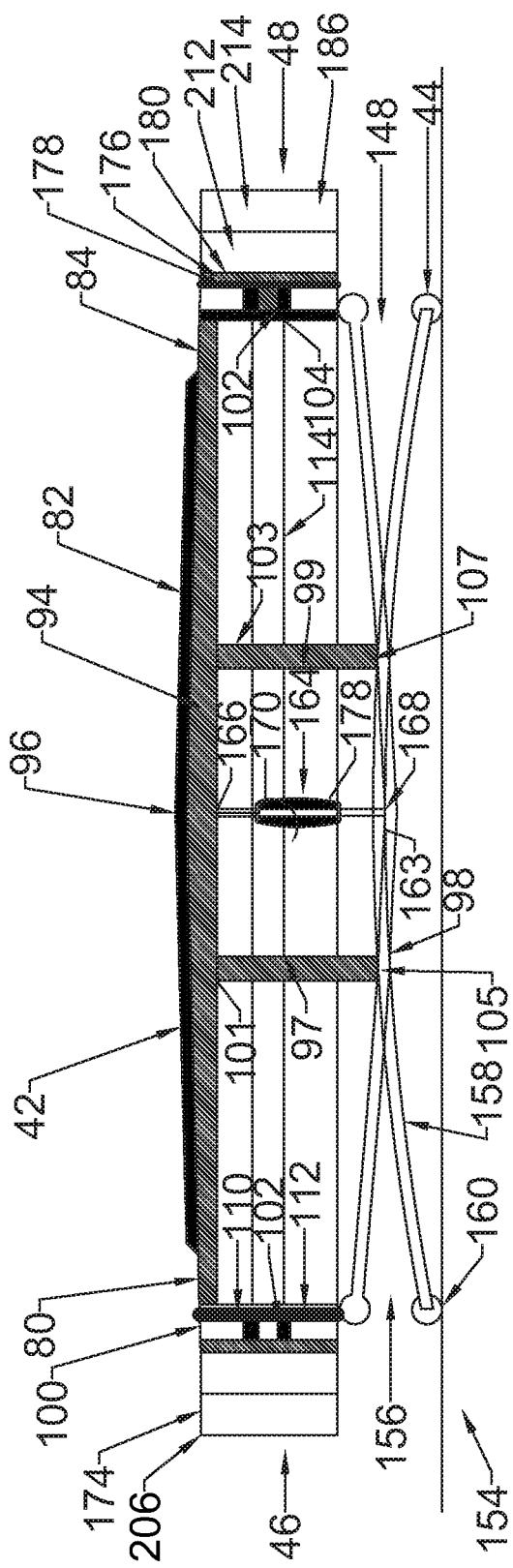
FIG. 10 is a sectional view taken along lines 10-10 of the body assembly of FIG. 8, with the front leg of the assembly not being shown.

As seen in FIG. 10, the platform in this example includes a lower layer 94 made of carbon fiber reinforced plastic in this example and an upper layer 96 coupled to and co-planar with the lower layer. The upper layer is made of closed-cell foam in this example. However, this is not strictly required. The layers of the platform may be made of other materials in other embodiments. As seen in FIG. 4, layer 94 extends about and outwardly from layer 96 of the platform in this example.

Referring to FIG. 10, the body 80 includes a pair of spaced-apart, elongate rib members 97 and 99 that are centrally positioned in this example, with each rib member being spaced inwards from the sides 46 and 48 of the assembly 40. The rib members have proximal ends 101 and 103 which couple to the lower layer 94 of the platform 84 in this example. The rib members 97 and 99 have distal ends 105 and 107 that are rounded in this example and spaced-apart downwards from the proximal ends thereof from the perspective of FIG. 10. The rib members couple to and extend downwards from the lower layer 94 of the platform 84 in this example. As seen in FIG. 10, the body 80 has a bottom 98 which is spaced-apart from the top 82 thereof. The bottom of the body coincides with distal ends 105 and 107 of the rib members 97 and 99 in this example.

As seen in FIG. 9a, the body 80 in this example includes a peripheral subassembly, in this example a rail system 100. The rail system includes a pair of spaced apart elongate rails, in this example elongate, linear-extending female members, in this case u-shaped channel 102 and 104. As seen in FIG. 10, the channels are parallel to the sides 46 and 48 of the assembly 40. As seen in FIG. 9a, the channels 102 and 104 have recesses 106 and 108 that face outwards.

The rail system 100 includes an upper peripheral member, in this example an upper hoop-like tube 110 which is rectangular in section. As seen in FIG. 4, tube 110 extends about the upper layer 94 of the platform 84 and extends along and adjacent to the sides 46 and 48, front 50 and rear 52 of the assembly 40. As seen in FIG. 10, tube 110 extends along the top 42 of the assembly 40 and is adjacent to the top.

Figure 8:
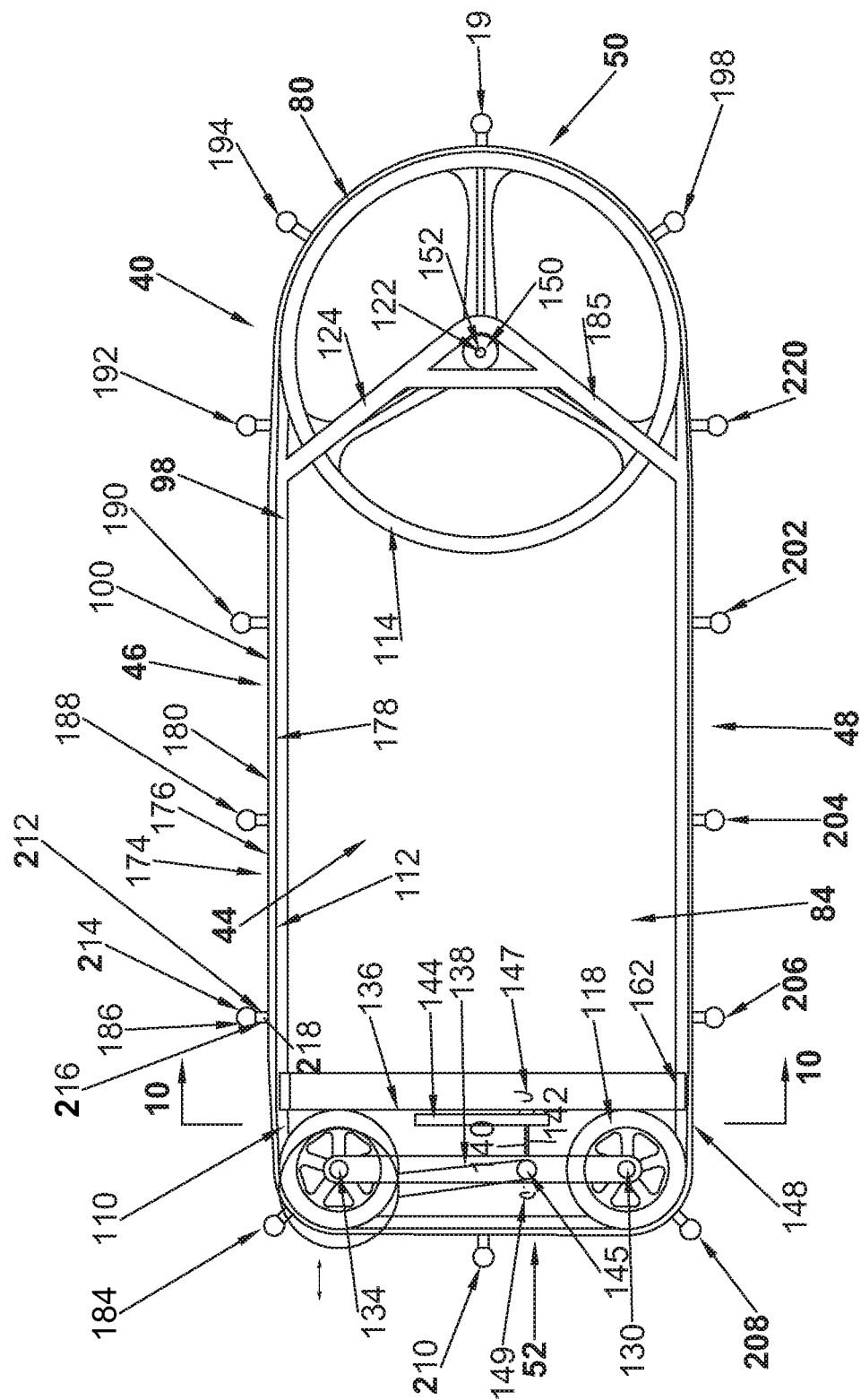
FIG. 8 is a bottom plan view thereof, the assembly including a plurality of pulleys and a rail system including upper and lower tubes, with the lower tube being shown partially in fragment to reveal the pulleys in more detail.

Referring back to FIG. 9a, the rail system 100 includes a lower peripheral member, in this example a lower hoop-like tube 112 that is rectangular in section and substantially similar in shape to and spaced-apart below tube 110. As seen in FIG. 8, tube 112 extends along and adjacent to the sides 46 and 48, front 50 and rear 52 of the assembly 40. As seen in FIG. 9b, tubes 110 and 112 are coupled together via channels 102 and 104. As seen in FIG. 10, tube 112 is positioned between the top 82 and bottom 98 of body 80.

As seen in FIG. 8, the assembly includes a plurality of rotational members disposed within and mounted to the body 80, in this case a forward pulley 114 and a pair of spaced-apart rearward pulleys 116 and 118. The forward pulley is positioned adjacent to the front 50 of the assembly 40 and extends between the sides 46 and 48 of the assembly. The forward pulley 114 rotates about an axle 122. The axle couples to tube 110 of the rail system 100 via a pair of mounting brackets 124 and 126 in this example. As seen in FIG. 10, the forward pulley 114 is horizontally aligned with channels 102 and 104 in this example.

Referring back to FIG. 8, the rearward pulleys 116 and 118 are adjacent to the rear 52 of the assembly 40, with pulley 116 being adjacent to side 46 of the assembly and pulley 118 being adjacent to side 48 of the assembly. Pulley 118 rotates about an axle 130. The pulley rotatably couples to platform 84 of the body 80 via axle 130 in this example. Pulley 116 rotates about an axle 134.

As seen in FIG. 8, the assembly 40 includes a tension adjustment mechanism 136 in this example. The tension adjustment mechanism includes an elongate member, in this example a bar 138 that pivotally connects to and extends between axles 130 and 134 of pulleys 118 and 116. The tension adjustment mechanism 136 further includes an adjustment member, in this example a length-adjustable tie rod 140. The tie rod has a first end 142 that couples to the platform 84 of the body 80 via a mount 144. The tie rod 140 has a second end 146 spaced-apart from the first end thereof. The second end of the tie rod pivotally connects to bar 138 and is positioned between axles 130 and 134 of the pulleys 118 and 116 in this example. Rotation of the tie rod in a first rotational direction 147 causes the ends 142 and 146 of the tie rod 140 to move closer together. Rotation the tie rod in a second rotational direction 149 opposite the first rotational direction causes the ends of the tie rod to move further away from each other.

Actuation of the tie rod 140 to an extended position causes the bar 138 and pulley 116 to angle outwards and become incrementally more spaced-apart from the front 50 of the assembly 40. This is shown by the second position of the pulley 116 and bar shown in dotted lines in FIG. 8. Conversely, rotation of the tie rod 140 to a shortened or retracted position causes the pulley and bar 138 to incrementally move towards the front 50 of the assembly.

The pulleys 116 and 118 are horizontally aligned with pulley 114 and thus coplanar and align with channels 102 and 104 seen in FIG. 10.

Figure 7:
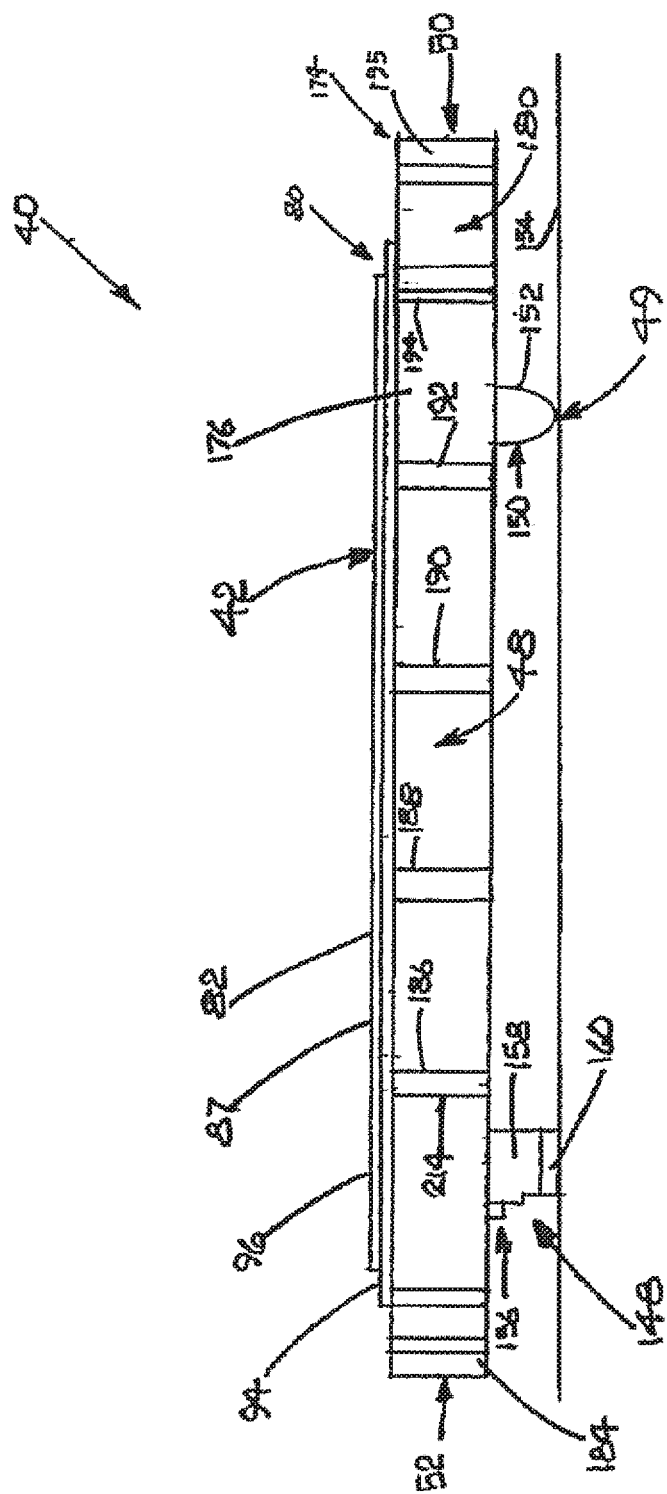
FIG. 7 is a right side elevation view thereof.

Still referring to FIG. 8, the assembly 40 includes a lower base, in this example a lower frame 148 upon which the body 80 is mounted. The lower frame includes a first subassembly, in this example a front leg 150 coupled to, aligned with and positioned below the axle 122 of the forward pulley 114. As seen in FIG. 7, the front leg has a distal end 152 that is round at least in part and which is configured to abut the surface on which the assembly 40 is to be used, in this example floor 154.

As seen in FIG. 10, the lower frame 148 includes a second subassembly, in this example a stability adjustment mechanism 156. As seen in FIG. 8, the stability adjustment mechanism is positioned near the rear 52 of the assembly 40, is positioned adjacent to rearward pulleys 116 and 118, and extends between the sides 46 and 48 of the assembly. Referring back to FIG. 10, the stability adjustment mechanism includes an elongate, resilient, flexible member 158 that is a rectangular prism in section in this example. The flexible member 158 has a pair of spaced-apart ends 160 and 162 positioned adjacent to sides 46 and 48 of the assembly 40. The ends of the flexible member 158 are round at least in part and are cylindrical in shape in this example. The flexible member 158 has a rounded, in this example arcuate or middle portion 163 positioned between ends 160 and 162 thereof.

The stability adjustment mechanism 156 includes an adjustment member, in this example a length-adjustable tie rod 164. The tie rod has a first end 166 coupled to the layer 94 of platform 84 of the body 80, and has a second end 168 spaced-apart from the first end. The second end of the tie rod 164 couples to the flexible member 158. The second end 168 of the tie rod is positioned between ends 160 and 162 of the flexible member in this example. Rotation of the tie rod 164 in a first rotational direction 170 causes the ends 166 and 168 of the tie rod to move closer together. Rotation of the tie rod in a second rotational direction 172 opposite the first rotational direction causes the ends of the tie rod to move further apart from each other.

The stability adjustment mechanism 156 has a stable configuration shown in solid lines in FIG. 10 in which stability of the body 80 is promoted. The spaced-apart ends 160 and 162 of the flexible member 158 abut the floor 154 when the flexible member is in the stable configuration. The flexible member is biased to be concave in a downwardly-facing direction when in the stable configuration shown in solid lines in FIG. 10. This mode may be more suited for novices, elderly people and the like who may want a lower degree of core work out.

Actuation of the stability adjustment mechanism 156 via rotation of tie rod 164 alters the extent to which the assembly 40 abuts the floor 154 via rounded surfaces. The flexible member 158 is deformable via said actuation to an unstable configuration, shown in dotted lines in FIG. 10, in which stability of the body is reduced. The flexible member is convex in a downwardly-facing direction in the unstable configuration. The ends 160 and 162 abut tube 112 in the unstable configuration and are spaced-apart above the floor 154 when the platform is level. The middle portion 163 of the flexible member is rounded and abuts the floor when the stability adjustment mechanism is in the unstable configuration. The bottom 44 of the assembly 40 is thus outwardly convex at least in part when in the unstable configuration shown in dotted lines in FIG. 10. The unstable configuration causes the paddler 85 seen in FIG. 1 standing on the platform 84 of the assembly 40 to more unbalanced and requires a greater degree of core strength to operate the assembly 40. The stability adjustment mechanism 156 thus enables the paddler to adjust the degree of difficulty of the workout when exercising using the assembly 40.

Referring to FIG. 4, the assembly 40 includes at least one peripheral member that couples to and is moveable at least in part linearly relative to the body 80. In this example, the peripheral member is an elongate flexible member, in this case an endless band 174 circumambient to and rotatably coupled to the body. The band includes an elongate portion 176. As seen in FIG. 10, the elongate portion of the band is a rectangular prism in lateral cross-section in this example.

Still referring to FIG. 10, the elongate portion 176 of the band 174 has an inner peripheral surface 178 that is inwardly-facing and an outer peripheral surface 180 that is outwardly-facing. The inner peripheral surface of the elongate portion of the band is shaped to abut tubes 110 and 112. The band 174 includes in this example an elongate male member, in this case a protruding strip 182 that couples to and extends inwardly from the inner peripheral surface 180 of the elongate portion 176 of the band 174 completely about the band. The protruding strip is an isosceles trapezoid is lateral cross-section in this example. The protruding strip 182 is positioned between tubes 110 and 112 in this example. The protruding strip is shaped to fit and be slidably engage with the channels 102 and 104 of the body 80 and pulleys 114, 116 and 118 of the assembly 40 seen in FIG. 8. Still referring to FIG. 8, the band 174 extends about the pulleys.

As seen in FIG. 4, the band 174 includes a series of longitudinally spaced apart protrusions 184, 186, 188, 190, 192, 194, 196, 198, 200, 202, 204, 206, 208 and 210 that couple to and extend outwardly from the outer peripheral surface 180 of the elongate portion 176 of the band. Each protrusion extends from the top 42 towards the bottom 44 of the assembly 40.

As seen in FIG. 4, each protrusion 186 includes a proximal portion, in this example a flange portion 212 that is a rectangular prism in shape in this example. Each flange portion 212 has a width Wp extending in the longitudinal direction of the elongate portion 176 of the band 174. Each protrusion 186 includes an enlarged distal portion 214 that is round at least in part and cylindrical in shape in this example. The distal portions of the protrusions couple to the elongate portion of the band via respective said flange portions 212 of the protrusions. Each distal portion 214 has a width W o extending in the longitudinal direction of the elongate portion of the band which is longer than that of the flange portions of the band. As seen in FIG. 8, a pair of opposed recesses 216 and 218 are formed on each protrusion, with each recess extending along the flange portion 212 of its protrusion 186 and being between the distal portion 214 of the protrusion and the elongate portion 176 of the band 174.

As seen in FIG. 1, the inner tube 68 of shaft assembly 54 is selectively engageable with one of the protrusions 186 to rotate the band relative to the body when the paddler pulls back on the shaft assembly. The band 174 is thus configured to engage with inner tube 68 of shaft assembly 54 to move the peripheral member about the body. The assembly 40 so configured and described provides a band configured to selectively move in opposite directions. The band 174 is moveable in a first direction, as shown by arrow of numeral 220, which in this example is counter-clockwise. Moving the band in the first direction mimics paddling on the right side 48 of a paddle-propelled navigation device, such as a paddleboard, boat, kayak or the like. The band 174 is moveable in a second direction, which in this example is a clockwise motion as shown by arrow of numeral 222. The second direction is opposite the first direction. Moving the band 174 in the second direction mimics paddling on the left side 46 of a paddle-propelled navigation device.

Referring to FIG. 8, the tension adjustment mechanism 136 allows selective adjustment of the tension of the band 174. This enables the paddler 85 seen in FIG. 1 to adjust the force required to move the band relative to the body and thus enables the paddler to adjust the degree of difficulty of the workout when exercising. The assembly 40 as herein described may be referred to as a paddle trainer or Paddletrainer™. The assembly is configured to train and provide exercise for paddlers who paddleboard, canoe, kayak, dragon boat, swim and the like, for example. The assembly may provide the user thereof with physical training and conditioning, and may also be useful for rehabilitation, as well as for the practice of yoga thereon, for example.

Figure 11:
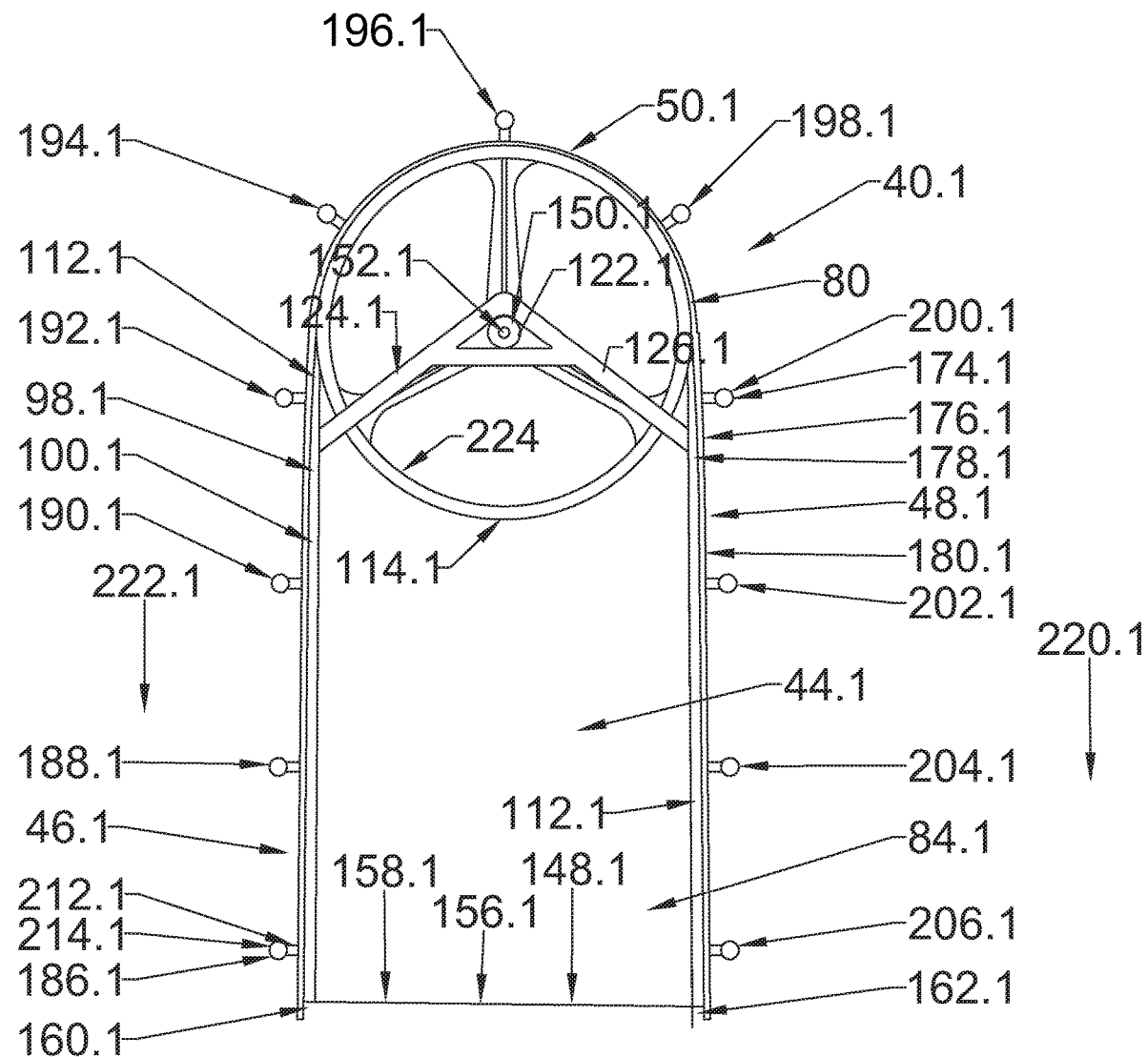
FIG. 11 is a bottom plan view of an exercise assembly shown in fragment according to a second embodiment, the assembly including a brake assembly.
Figure 12:
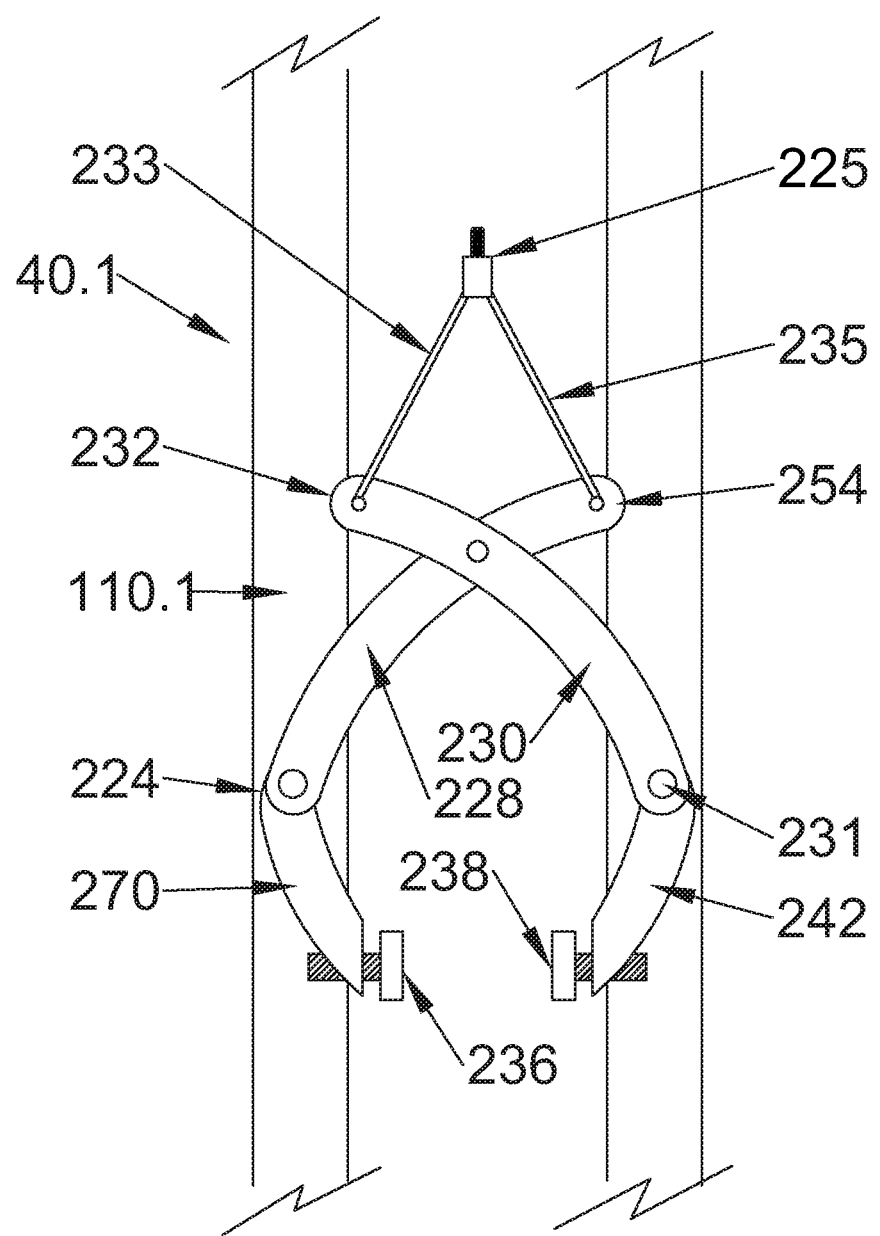
FIG. 12 is an enlarged, fragmentary bottom plan view of the brake assembly of FIG. 11.

FIGS. 11 to 12 show an exercise assembly 40.1 according to a second embodiment. Like parts have like numbers and function as the embodiment shown in FIGS. 1 to 10 with the addition of decimal extension ".I". Exercise assembly 40.1 is substantially the same as exercise assembly 40 shown in FIGS. 1 to 10 with the following exceptions.

In this embodiment, assembly 40. I further includes a speed brake assembly 224. The brake assembly includes a brake handle 226 which may be selectively positioned and held in place. The brake assembly further includes a pair of levers 228 and 230 pivotally coupled to tube 110 via pivots 229 and 231. First ends 232 and 234 of the levers couple to the brake handle via brake cable 233 and 235. The brake assembly 224 include a pair of brake pads 236 and 238 that couple to second ends 240 and 242 of the levers 228 and 230. The pivots 229 and 231 of the levers 228 and 230 are positioned between the first and second ends of the levers. Selective actuation of the brake handle 226 causes the brake pads to selectively engage pulley 114.1. This increases the force necessary to rotate the band 174.I about the pulleys 114.I and thus the body 80.1. In this manner, the degree of difficulty of the workout when exercising may be further adjusted.

Figure 13:
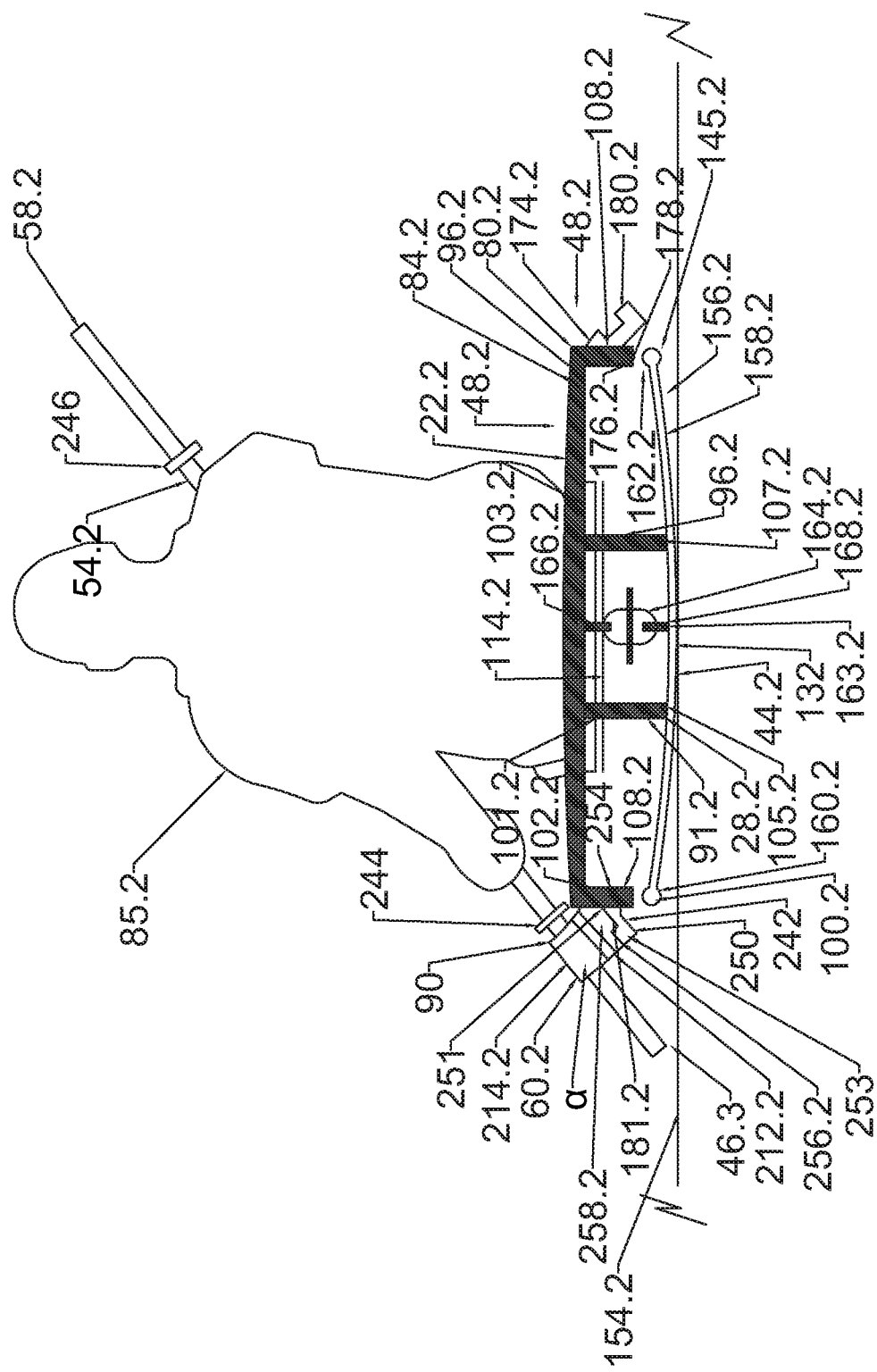
FIG. 13 is a rear sectional view of an exercise assembly according to a third embodiment, together with a person sitting thereon and engaging the endless band of the assembly via a pole, with a front leg of the assembly not being shown.

FIG. 13 shows the exercise assembly 40 as utilized by paddlers according to a further embodiment. In such operation, the exercise assembly 40 is substantially the same as exercise assembly 40 shown in FIGS. 1 to 10 with the following exceptions.

In this embodiment, shaft assembly 54 comprises tube 56, with a pair of splash guards 244 and 246 near ends 58 and 60 thereof. Operation of the shaft assembly thus mimics a kayaker's paddling, for example.

Instead of channels with upper and lower tubes coupled thereto, m this embodiment rail system 100 comprises a single integrated unit. The exercise assembly 40 includes a second peripheral member, in this example a second elongate flexible member, in this case an endless insert 248 circumambient to and rotatably coupled to the body 80. The insert includes an elongate portion 250. The elongate portion of the insert 248 is wedge-shaped in lateral cross-section in this example. The elongate portion 250 of the insert has a first or upper end 251 that is tapered and narrow, and which aligns with the top 42 of the assembly 40. The elongate portion of the insert 248 has a second or lower end 253 spaced-apart from the upper end. The lower end of the elongate portion 250 of the insert is thicker than upper end of the elongate portion of the insert in this example.

The insert 248 has an inner peripheral surface 252 that is inwardly-facing and which abuts channel 102. The insert includes a male member, in this example a protruding strip 254 that couples to and extends outwards from the inner peripheral surface of the elongate portion of the insert 248. The protruding strip is shaped to fit within channel 102.

The elongate portion 250 of the insert 248 has an outer peripheral surface 256 that is outwardly facing and which is shaped to abut the peripheral surface 178 of the elongate portion 176 of band 174. The insert 248 has a female member, in this example an endless recess 258 shaped to receive protruding strip 182 of the band.

The insert causes the band 174 to angle outwards as the protrusions 206 extend downwards from the top 42 of the assembly 40 towards the bottom 44 of the assembly. The protrusions are angularly spaced-apart from platform 84 or horizontal plane by an angle a in this example which is equal to less than 90 degrees. This embodiment and configuration may lend itself to a paddler who wants to mimic kayaking and/or paddle boarding while sitting on top of the platform 84.

Figure 14:
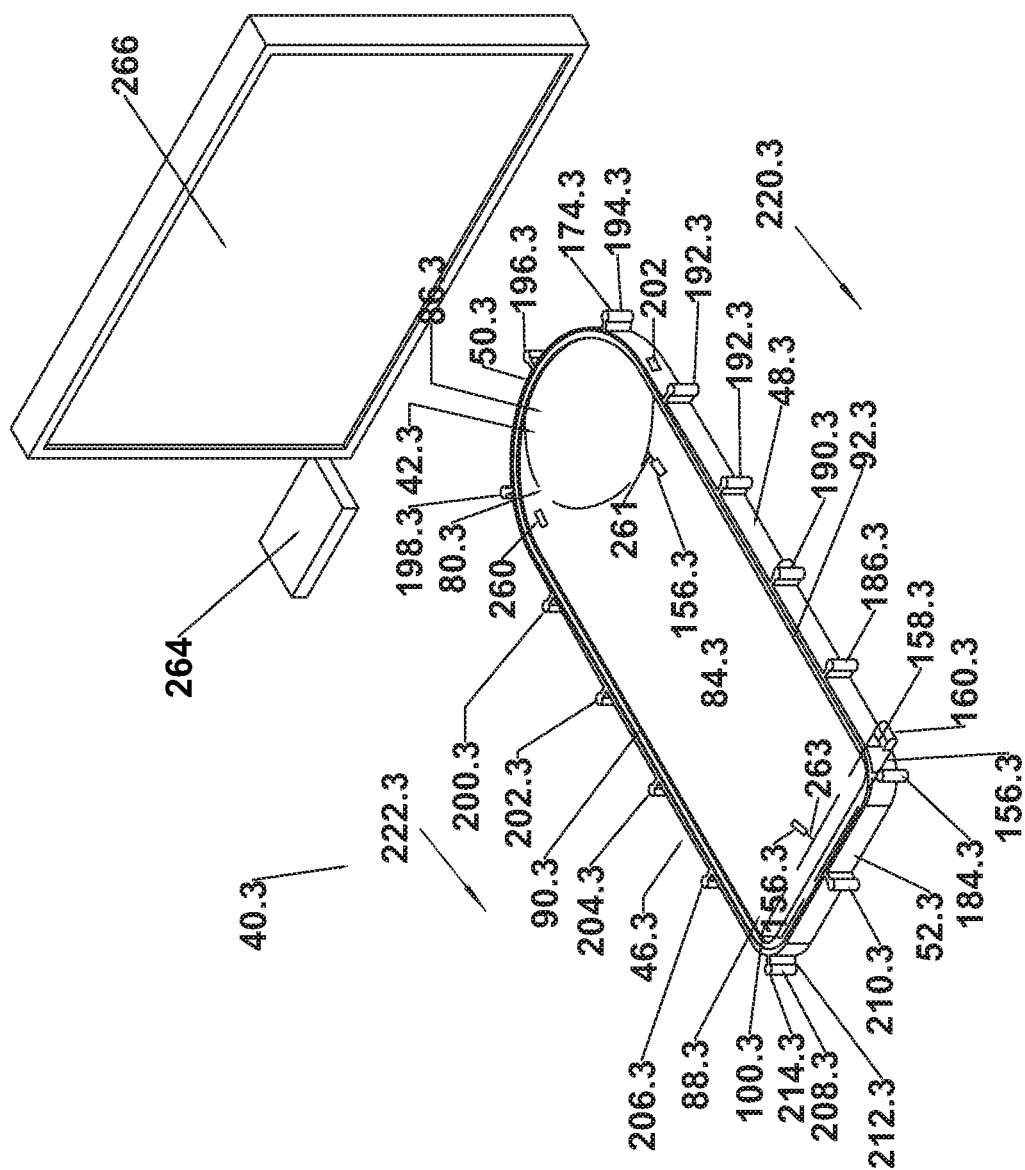
FIG. 14 is a top, rear, side perspective view of an exercise assembly according to a fourth embodiment.
Figure 15:
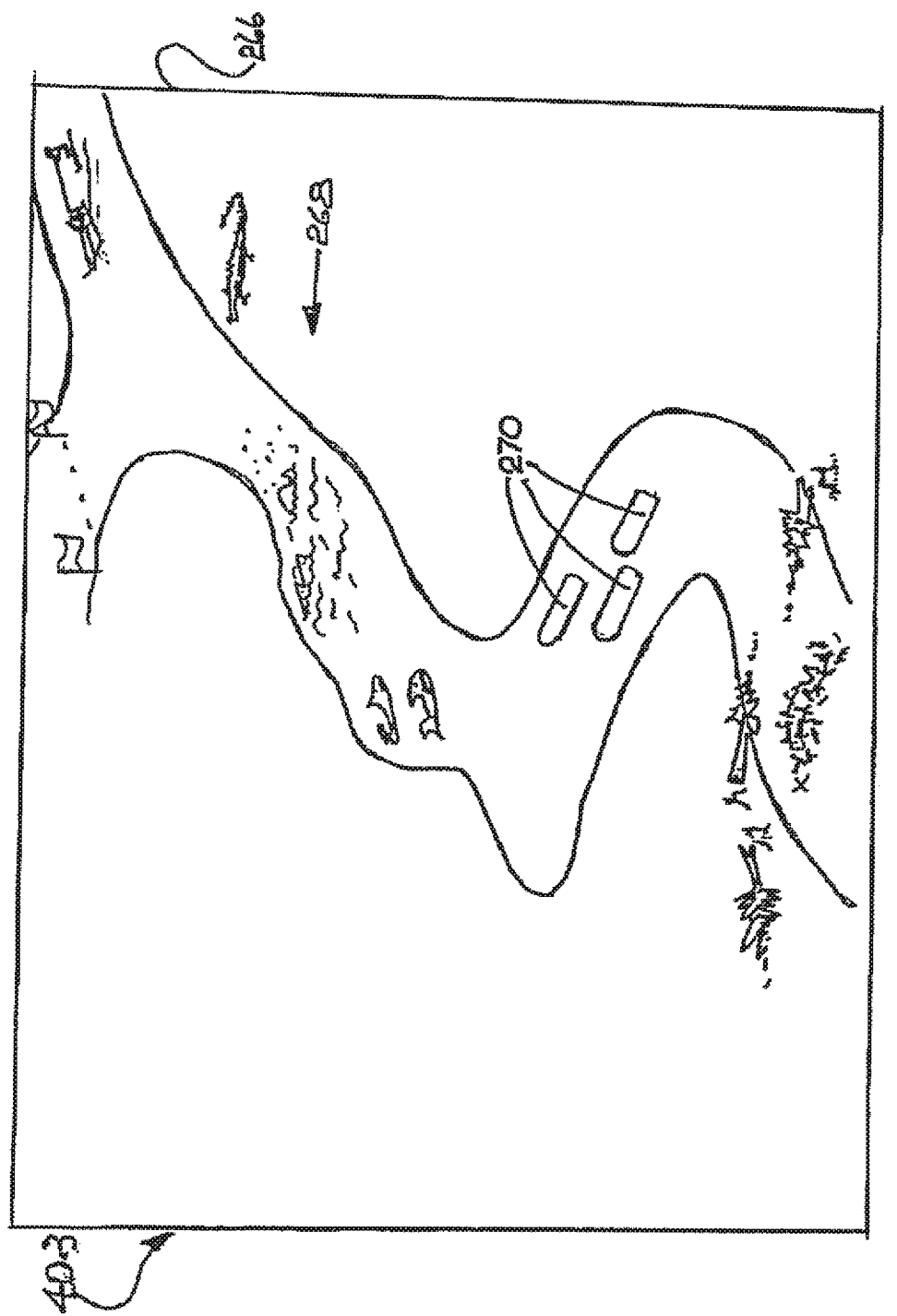
FIG. 15 is a schematic view of a video screen image of the assembly of FIG. 14.

FIGS. 14 to 15 show an exercise assembly 40 for paddlers according to a fourth embodiment. Exercise assembly 40 is substantially the same as exercise assembly 40 shown in FIGS. 1 to 10 with the following exceptions.

Assembly 40 in this embodiment is used as part of an interactive video game. The assembly includes a plurality of sensors, in this example directional port sensor 260 and directional starboard sensor 262 positioned to determine the speed at which and direction in which the band 174 is rotated relative to body 80. The assembly 40 includes a processor, in this example in the form of a gaming console 264 configured to receive signals outputted from the sensors. The console is coupled to a monitor 266.

The assembly 40 further includes an interactive tension adjustment mechanism 136 which incorporates an actuator, in this example a linear actuator 261. The actuator and tension adjustment mechanism are in communication with the gaming console 264.

The assembly 40 includes an interactive stability adjustment mechanism 156 which incorporates an actuator, in this example a linear actuator 263. The actuator and stability adjustment mechanism are in communication with the gaming console 264.

Referring to FIG. 15, obstacle course indicia 268 may be displayed on the monitor 266 as part of the game. The player of the game selectively moves the band 174 seen in FIG. 14 in various directions and manners. Referring to FIG. 14, this motion and direction is signalled to the gaming console via the sensors 260 and 262. Referring back to FIG. 15, the gaming console is in turn configured to cause a virtual paddle-propelled navigation device, as shown by indicia 270 in FIG. 15, to navigate course indicia 268.

At various parts in the game, the gaming console 264 is configured to send signals to selectively actuate actuator 261 and thereby adjust the degree of difficulty of the workout when exercising using the assembly 40 by rendering rotation of band 174 more difficult. Similarly, the gaming console is configured to send signals to selectively actuate actuator 263 and thereby adjust the degree of stability of platform 84. This in turn also increases the degree of difficulty of the workout in accordance with developments in the game. Speed sensors, linear actuators, gaming consoles, interactive video games and the like, including their various parts and functions, are known per se and will thus not be described in further detail.

Figure 16:
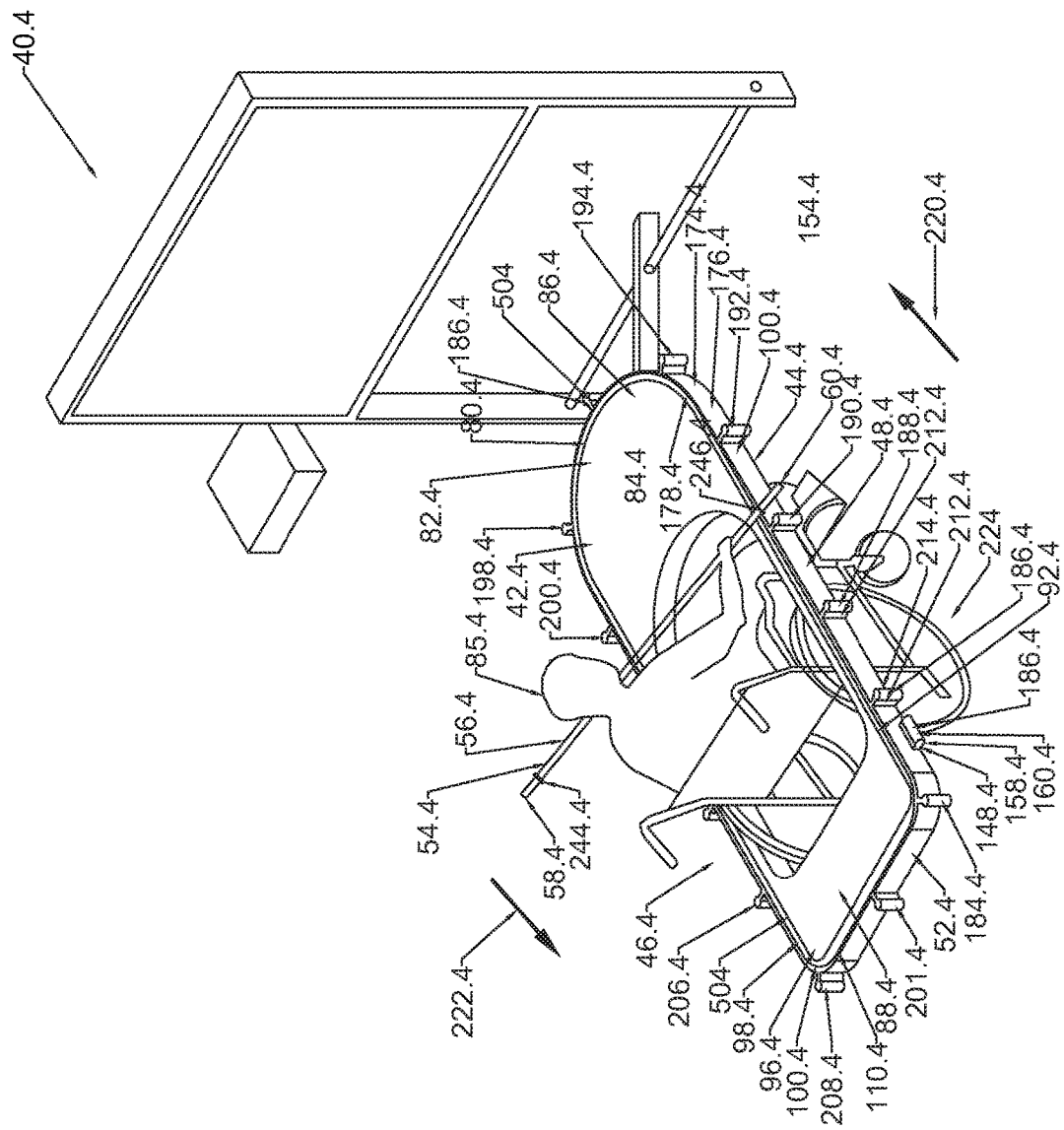
FIG. 16 is a top, rear, side perspective view of an exercise assembly according to a fifth embodiment, together with a pole and a person in a wheelchair engaging the endless band of the assembly via the pole.

FIG. 16 shows an exercise assembly 40 according to a fifth embodiment. Exercise assembly 40 is substantially the same as exercise assembly 40 shown in FIGS. 1 to 10 with the following exceptions.

Body 80 has a central aperture 272 positioned between the front 50 and rear 52 of the assembly 40, and extending between the sides 46 and 48 of the assembly. The aperture is shaped to receive a paddler 85 in a wheelchair 274 therethrough. The body 80 is shape to receive and selectively couple to the wheelchair.

It will be appreciated that many variations are possible within the scope of the invention described herein. For example, instead of the protrusions of the band being approximately T-shaped, the band in another embodiment may have grooves within which the handle engages with protrusions of the handle.

In a further variation, the body may have an outwardly-extending male member or protruding strip shaped to fit within a corresponding female member or channel of the band.

Figure 17:
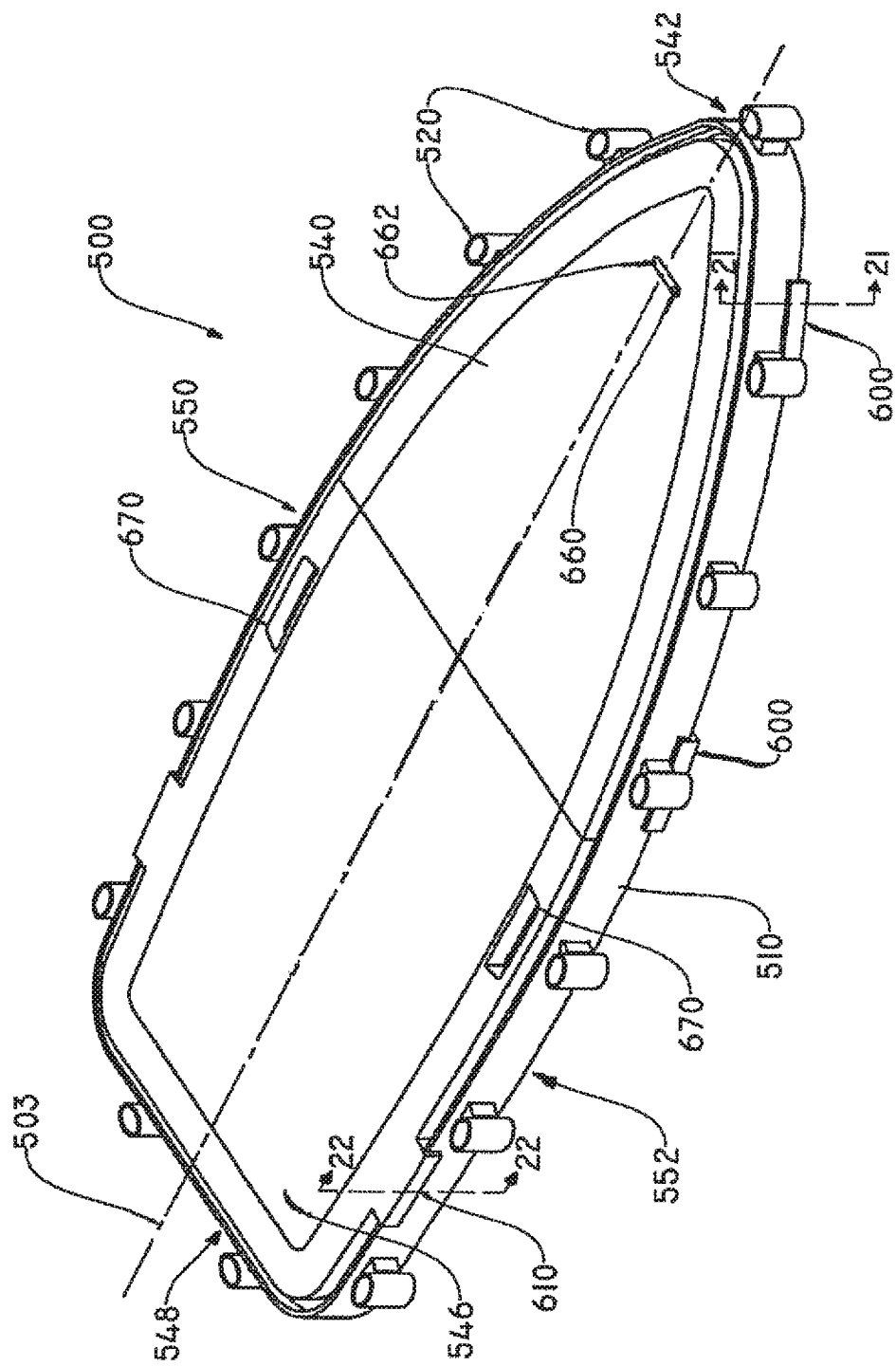
FIG. 17 is a top perspective view of an exercise assembly according to a first embodiment of the present invention with a user located thereon.

Turning now to FIG. 17, a further embodiment of the exercise apparatus in accordance with the present invention is illustrated generally at 500. The exercise apparatus 500 comprises a body 502 extending along a longitudinal axis 503 having a top surface 502 extending substantially horizontally thereacross. The exercise apparatus 500 also includes an endless belt or band 510 extend therearound and is rotatably supported relative to the body. The belt 510 includes a plurality of protrusions 520 extending therefrom adapted to be engaged by the shaft or pole 54 of a user as will be more fully described below. The belt 510 may be formed from any suitable flexible belting material, such as, by way of non-limiting example, rubber, fabrics or the like. In particular, the belt 510 may be formed from fabric reinforced conveyor belts such as, by way of non-limiting example, PVC 150 conveyor belt or the like.

Figure 25:
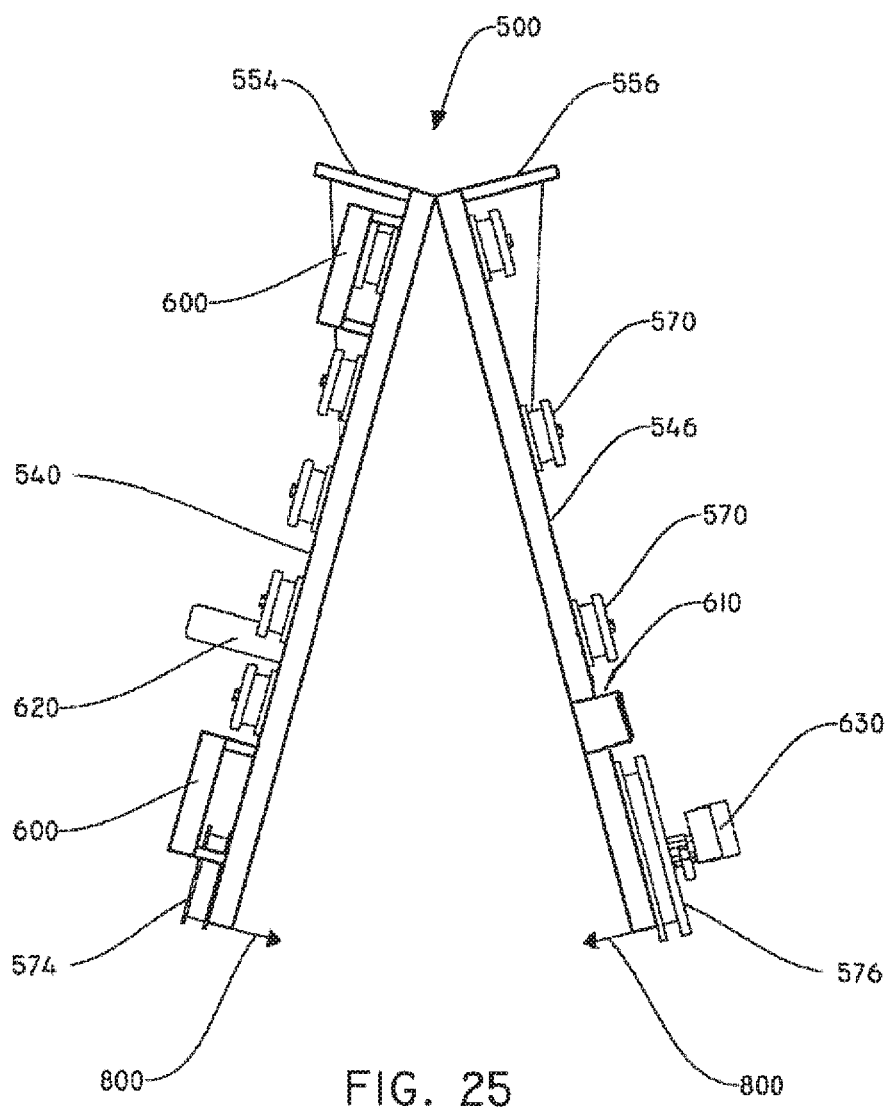
FIG. 25 is a side view of the apparatus of FIG. 17 with the belt removed and folded in half.

As illustrated in FIG. 1, the body 502 may be formed from front and rear portions, 540 and 546, respectively which are hingedly connected to each other so as to permit the body to be folded in half along directions generally indicated at 800 for storage and transportation as illustrated in FIG. 25. The body 502 may be formed in a shape roughly corresponding to a paddle board or surf board with arcuate side edges 550 and 552. The body extends between a rear edge 548 extending along a plane substantially perpendicular to the longitudinal axis 503 and a front edge 542. As illustrated, the front portion 540 includes the front edge 542 and the rear portion 546 includes the rear edge 548. The front and rear portions 542 and 546 may be connected along a hinge line defining the end of each portion opposite to the front or rear edge 542 or 548. As illustrated in FIG. 17, one or both of the front and rear portions 540 and 546 may include handles 670 in the top surface thereof. The handles 670 may be useful for carrying the apparatus as well as for being grasped by a user when seated or otherwise located upon the top surface such as, by way of non-limiting example, for use in yoga or the like.

Figure 18:
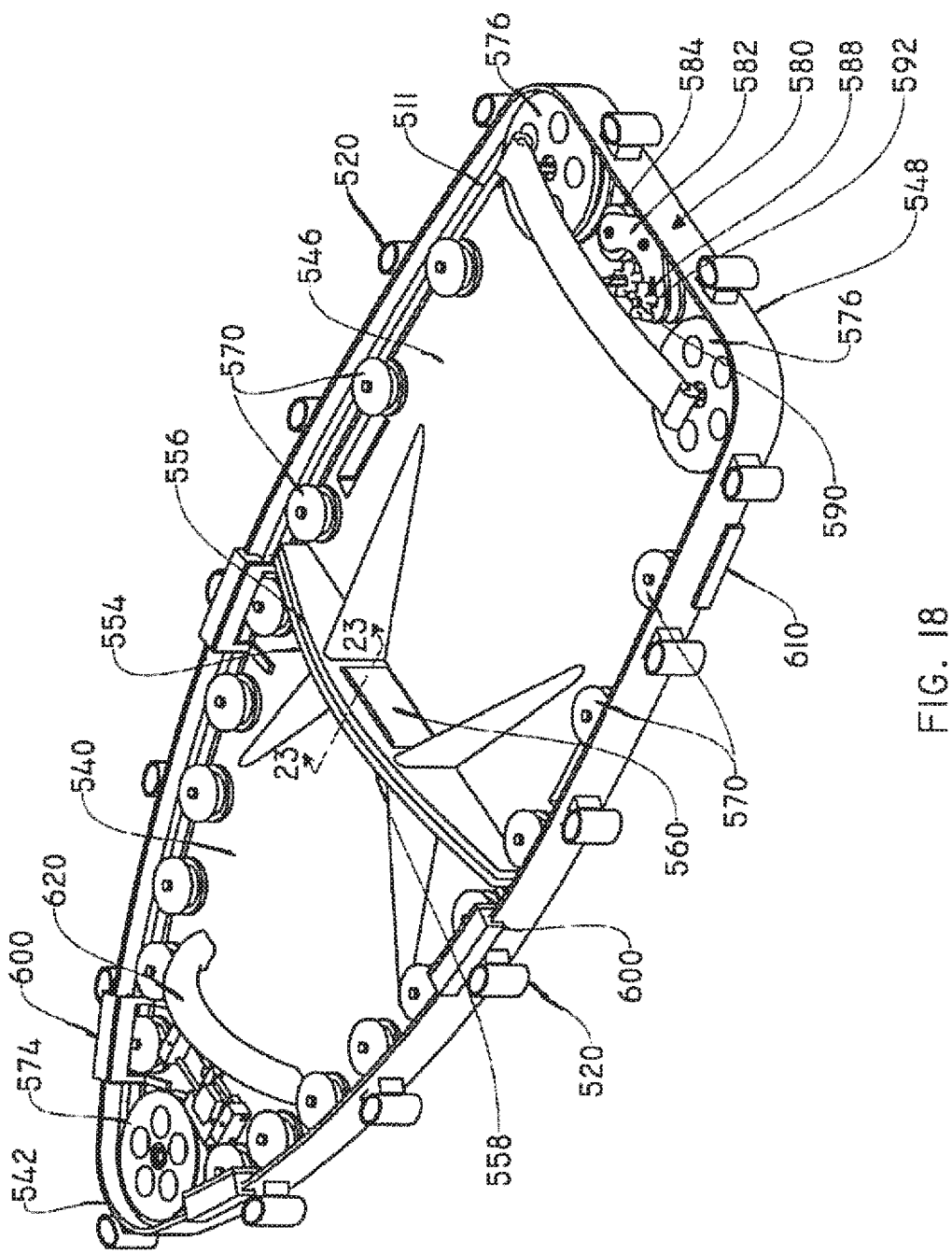
FIG. 18 is a bottom perspective view of the exercise assembly of FIG. 17.
Figure 23:
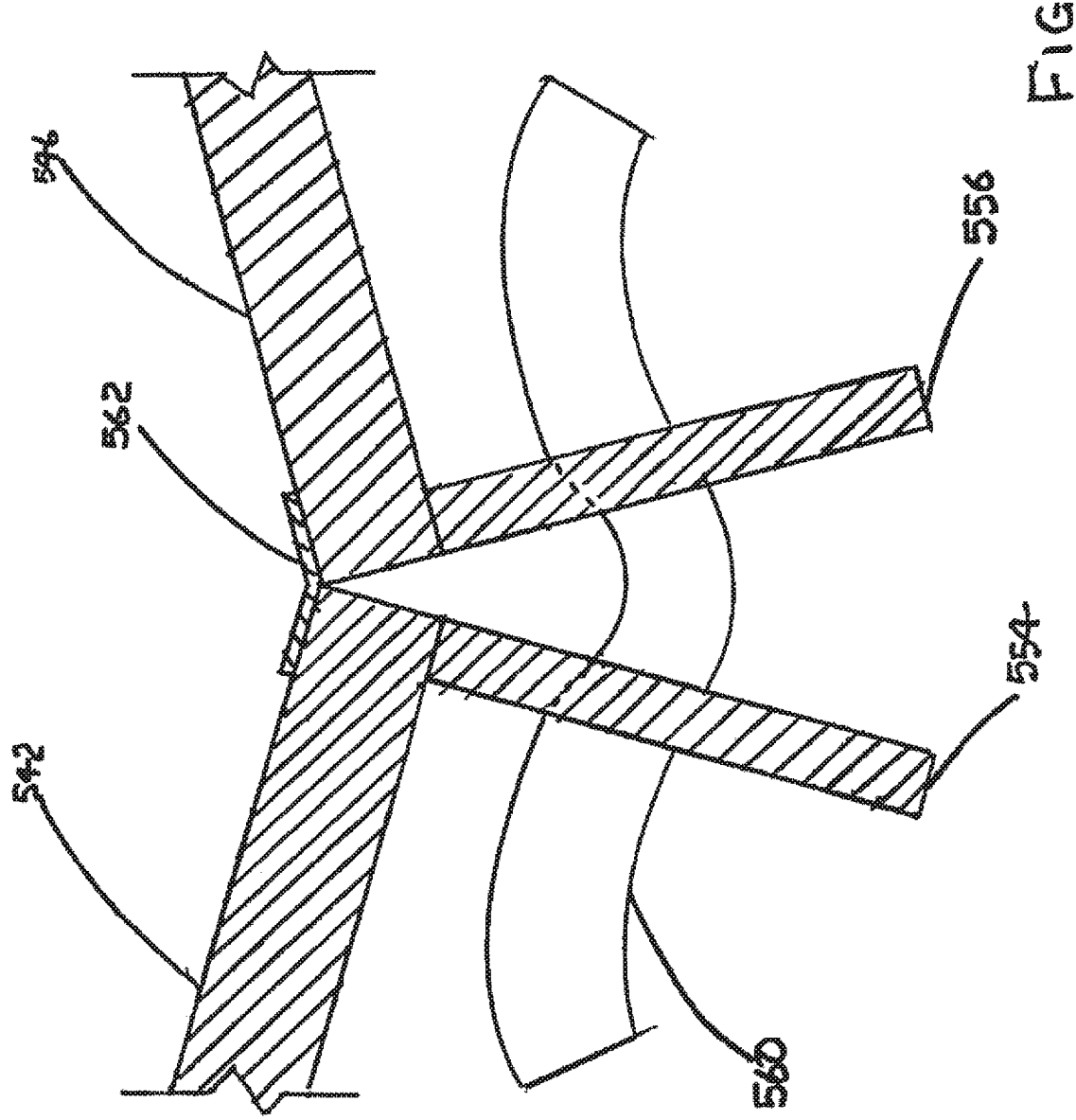
FIG. 23 is a cross sectional view of the middle connection for joining the front and rear portions of the body of the exercise apparatus of FIG. 17 as taken along the line 23-23.

As illustrated in FIG. 18 the front portion 540 may include a rear end wall 554 and the rear portion may include a front end wall 556 which are adapted to abut against each other. Each of the rear end wall 554 and front end wall 556 may include slots 558 therethrough for receiving a strap 560 or the like to selectably connect the front and rear portions together. As illustrated in FIG. 23, a belt 562 or other flexible connection between the front and rear portions 540 and 546 may be secured to a top surface of the body so as to allow relative movement between the front and rear portions when secured to each other. The strap 560 may be connected to itself with any known buckling or fastening means including hook and loop fasteners, buckles, snaps or the like. When not in use, the strap 560 may be disconnected from itself and portions thereof threaded out of the slots 558. Thereafter the front and rear portions 540 and 546 may be rotated relative to each other about the belt 562. IN particular, the front and rear portions 540 and 546 may be rotated to be substantially parallel to each other with the front end 542 and the rear end 548 adjacent to each other. It will be appreciated that the belt 510 may be removed for such storage configuration by loosening of tensioners a will be more fully described below.

Figure 21:
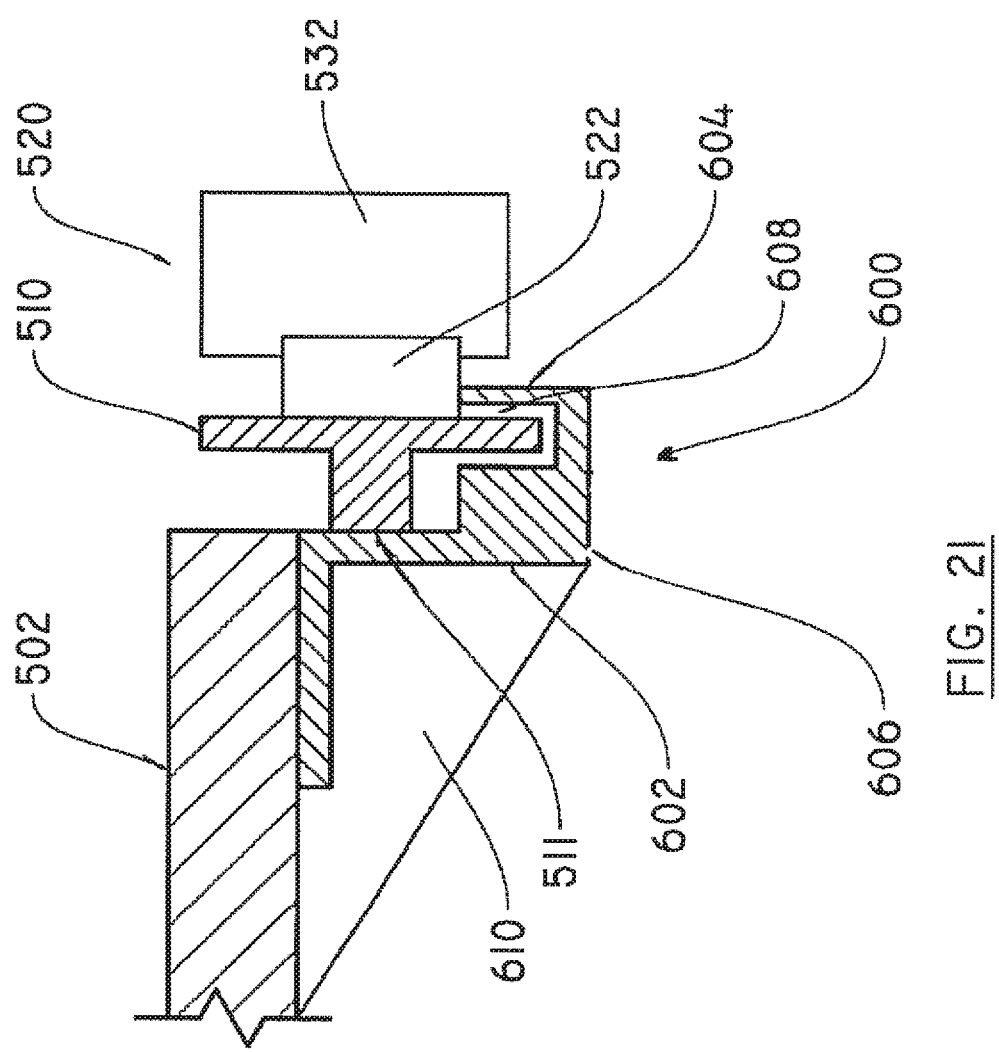
FIG. 21 is a cross sectional view of a top guide of the exercise apparatus of FIG. 17 as taken along the line 21-21.
Figure 22:
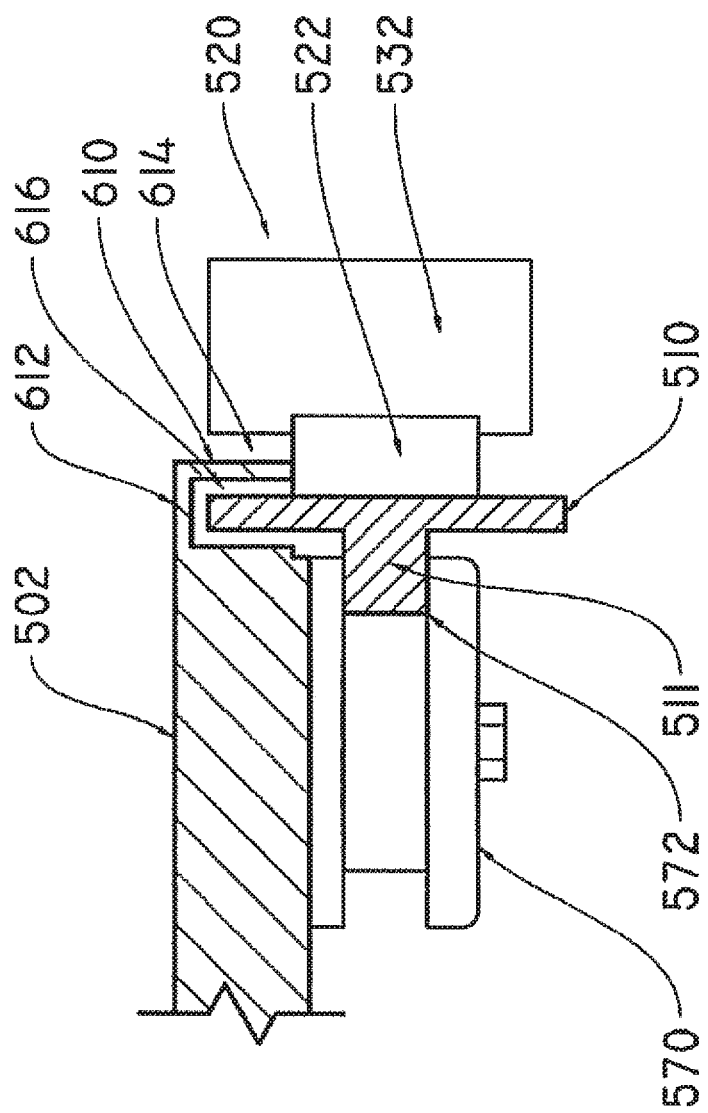
FIG. 22 is a cross sectional view of a bottom guide of the exercise apparatus of FIG. 17 as taken along the line 22-22.

As illustrated in FIG. 18, the underside of the body 502 includes a plurality of rollers 570 therearound along the periphery of the body. The rollers 570 support the belt 510 so maintain it along the shape of the body 502 as well as keep the belt 510 at a desired height relative to the body. As illustrated in FIGS. 21 and 22, the belt 510 may include a rib 511 extending therealong wherein the rollers 570 may also include a groove 572 therearound sized to receive the rib 511.

As illustrated in FIG. 18, a larger lead roller 574 may be positioned proximate to the front edge 542 of the body and corner rollers 576 may be positioned to each side of the rear edge 548. It will be appreciated that such larger rollers may be stronger to bear a greater tension in the belt 510 as well as to form more gradual bends in the path of the belt 510. The rollers 570, 574 and 576 may be rotatably connected to and supported by the body 502 by any known means, such as, by way of non-limiting example, bushings, bearings or the like.

As illustrated in FIG. 18, the body 502 may include one or more tensioner assemblies 580 for applying a tension to the belt 510. The tensioner assembly 580 may be of any type as are known and in particular as illustrated may comprise a rotating arm 582 supported by the body with a tensioning roller 584 on one end with a selectable connector 586 on the other end. In particular, the selectable connector 586 may comprise a slot 588 in the arm 582 through which a threaded rod 590 and a thumb wheel 592 is passed. The threaded rod 590 is secured to the body such that tightening of the thumb wheel 592 fixes the location of the threaded rod 590 in the slot 588 so as to fix the orientation of the rotating arm 582 and thereby the distance by which the tensioning roller 582 is extended from the body.

The body 502 may also include a plurality of guides extending from a peripheral edge of the body adapted to support the belt 510. In particular, the apparatus may include one or more bottom guide 600 and one or more top guides 610. The bottom guides 600 are located in the front portion 540 and hold the belt up so as to prevent movement of the user's pole from pushing the belt off the rollers at the start of their stroke. As illustrated in FIG. 21, the top guides 600 comprises a u-shaped member having inner and outer walls, 602 and 604, respectively with a web portion 606 therebetween which form a bottom track 608 sized to receive the belt 510 therein. The apparatus may as many bottom guides on each side of the apparatus as are necessary to support the belt 510. By way of non-limiting example, the apparatus illustrated in FIGS. 17 and 18 includes two bottom guides per side.

The top guides 610 are located in the rear portion 546 and hold the belt down so as to prevent lifting of the belt 510 by the user's pole during the follow through of their stroke. As illustrated in FIG. 22, the top guide comprises a top planar member 612 extending from the body to an outer wall 614 which extends downwardly therefrom. The outer wall 614 and top planar member 612 form a top pocket 616 sized to receive the belt 510 therein. The apparatus may as many top guides 610 on each side of the apparatus as are necessary to support the belt 510. By way of non-limiting example, the apparatus illustrated in FIGS. 17 and 18 includes one bottom guides per side.

As illustrated in FIG. 18, the apparatus includes a plurality of ground supports extending from the bottom thereof. In particular, the front portion 542 includes an arcuate body 620 extending therefrom and each of the rear and front end walls 554 and 556 includes an arcuate surface. These arcuate surfaces permit the body 502 to rotate on a support surface such as a floor so as to permit the body 502 to rock during operation by a user. The apparatus also includes an adjustable support 630 in the rear portion. The adjustable support may be configured to have a similar concave profile as the arcuate body 620 and the rear and front end walls 554 and 556 or may optionally have its curvature adjusted to reduce the ability of the body 502 to rotate as will be more fully described below. It will be appreciated that although the adjustable support is located in the rear portion 546, it may also be located in any other location or more than one of the supports may be adjustable as described herein.

Turning now to FIGS. 19a and 19b, the adjustable support 630 is formed of a flexible elongate member 632 extending transversely to the axis 503 of the apparatus. The flexible member 632 and is supported proximate to each end with a fixed support 638. An adjustable support 640 is located at a middle portion of the flexible member 632. The adjustable support 640 comprises a threaded rod 642 extending from the flexible member 632 which is received in a thumb wheel 644 supported by the body 502. As a user rotates the thumb wheel 644, the threaded rod 642 is telescoping adjusted therein so as to adjust the length of the adjustable support 630 and thereby the curvature of the flexible member 632. As illustrated in FIG. 19a, the adjustable support 640 is shortened so as to cause the flexible support to have a concave profile in which the apparatus will be more stable. As illustrated in FIG. 19b, the adjustable support 640 is lengthened so as to cause the flexible member 632 to have a convex shape thereby making the apparatus less stable. In such a manner, a user may select the degree of stability they wish for the apparatus to have.

Turning now to FIG. 20, one or more of the rollers, such as, by way of non-limiting example, the lead roller 574 may include a brake 650 to adjust the force required by a user to rotate the belt 510. The brake 650 may comprise a carriage 652 slidably supported along a transverse track 654 under the body 502. The carriage 652 may include a brake shoe 656 having a braking surface 658 positioned to engage upon and frictionally limit rotation of the lead roller 574. In practice it has been found that a concave braking surface 658 has been useful although it will be appreciated that other surface shapes may be utilized as well. As illustrated in FIG. 17, the carriage 652 includes an actuation button 660 extending through a slot 662 in the body. The actuation button 660 is operably connected to a lug 662 extending from the carriage 652. The lug 662 cooperates with and is adapted to engage into one of a plurality of receiving locations 666 in a bracket 664 adjacent to the carriage 652. In operation, a user may push the actuation button 660 and to disengage the lug from one of the receiving locations and thereafter reposition the carriage to the desired position to adjust the amount of braking desired at which point the button may be pressed again to reengage the lug within one of the receiving locations.

Figure 24:
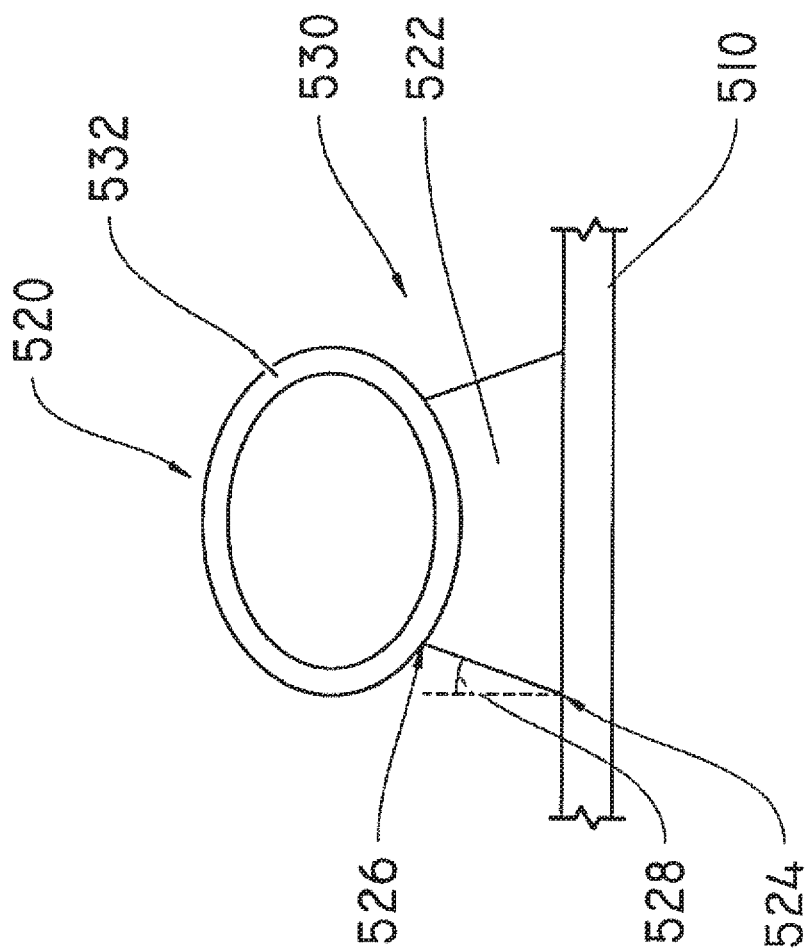
FIG. 24 is a plan view of one of the protrusions of the endless belt of the exercise apparatus of FIG. 17.

As illustrated in FIG. 24, the protrusions 520 are secured to the belt 510 by any known means, such as, by way of non-limiting example, fasteners adhesives or the like. The protrusions 520 are formed of a connecting portion 522 and an enlarged portion 532. The connecting portion 522 extends from a proximate end 524 secured to the belt 510 and a distal end 526 distal thereto. The enlarged portion 532 is secured to the distal end 526. The connecting portion 522 may taper between the proximate and distal ends by a taper angle generally indicated at 528. The taper angle may be selected to be between 15 and 30 degrees so as to form a notch 530 between the connecting portion and the enlarged portion as illustrated. The notch 530 assists with engaging the rod or pole 54 of the user therein so as to permit translation of movement from the pole to the belt 510. The enlarged portion 532 of may be formed to have a width extending parallel to the belt 510 that is wider than the proximate end It will be appreciated that although different embodiments of the present invention are illustrated, that the features of such embodiments may be combined in any manner as desired.

While specific embodiments of the invention have been described and illustrated, such embodiments should be considered illustrative of the invention only and not as limiting the invention as construed in accordance with the accompanying claims.

What is claimed is:

1. An exercise apparatus comprising:
    a body having a peripheral edge and a top surface adapted to support a user standing thereon;
    an endless band extending around said body along a path substantially perpendicular to said top surface, said endless band being slidably supported by said body for rotational movement thereabout; and
    a plurality of protrusions extending from said endless band to a distance radially outward of said peripheral edge of said body, said protrusions adapted to be engaged upon by an object manipulated by the user.
2. The apparatus of claim 1 wherein said body includes at least one guide vertically supporting said endless band.
3. The apparatus of claim 2 wherein said at least one guide includes at least one bottom guide below said endless band.
4. The apparatus of claim 3 wherein said at least one bottom guide is located in a front portion of said body.
5. The apparatus of claim 2 wherein said at least one guide includes at least one top guide above said endless band.
6. The apparatus of claim 5 wherein said at least one top guide is located in a rear portion of said body.
7. The apparatus of claim 1 wherein said each of said plurality of protrusions includes an enlarged distal portion and a connecting portion between said distal portion and said endless band.
8. The apparatus of claim 7 wherein said enlarged portion has a width greater than said connecting portion along a direction parallel to said endless band.
9. The apparatus of claim 8 wherein said connecting portion tapers in width from an end adjacent to said endless band to an end adjacent to said enlarged portion.
10. The apparatus of claim 1 wherein said body includes at least one ground support extending from a bottom thereof.
11. The apparatus of claim 10 wherein said at least one of said ground supports comprises a flexible member fixedly supported at ends thereof and having an adjustable support at a middle portion thereof, wherein adjustment of said adjustable support varies the radius of said flexible member to adjust the stability of said body.
12. The apparatus of claim 11 wherein said adjustable support comprises a threaded rod.
13. The apparatus of claim 10 wherein said at least one ground support includes a front ground support located adjacent to a front end of said body, a rear ground support located adjacent to a rear end of said body and a middle ground support located at a midpoint of said body.
14. The apparatus of claim 10 wherein said at least one of said ground supports comprises an arcuate surface so as to permit said body to rotate thereon along a longitudinal axis relative to a supporting surface.
15. The apparatus of claim 1 wherein said body includes a plurality of rollers supporting said endless band.
16. The apparatus of claim 15 further comprising a brake selectably engageable upon at least one of said rollers so as to adjust a resistance to rotation of said endless belt.
17. The apparatus of claim 16 wherein said brake comprises a shoe having a braking surface slidably movable into engagement upon said at least one of said rollers.
18. The apparatus of claim 1 further comprising a tensioning roller rotatably engageable upon said endless band in a radial direction to apply adjustable tension to said endless band.
19. The apparatus of claim 1 wherein said body is formed in two portions hinged together at a midpoint thereof.
20. A method of simulating a paddle board comprising:
    supporting a user upon a top surface of a body, said body having a peripheral edge theraround;
    rotatably supporting an endless band around said body along a path substantially perpendicular to said top surface for rotational movement thereabout; and
    receiving an engagement upon at least one of a plurality of protrusions extending radially past said peripheral edge of said body from said endless loop by an object manipulated by the user.

* * * * *